(12) United States Patent
Cruickshank et al.

(10) Patent No.: US 11,987,531 B2
(45) Date of Patent: May 21, 2024

(54) ULTRA-HIGH DIELECTRIC CONSTANT GARNET

(71) Applicant: Skyworks Solutions, Inc., Irvine, CA (US)

(72) Inventors: David Bowie Cruickshank, Rockville, MD (US); Michael David Hill, Frederick, MD (US)

(73) Assignee: Skyworks Solutions, Inc., Irvine, CA (US)

( * ) Notice: Subject to any disclaimer, the term of this patent is extended or adjusted under 35 U.S.C. 154(b) by 256 days.

(21) Appl. No.: 17/246,424

(22) Filed: Apr. 30, 2021

(65) Prior Publication Data

US 2021/0317044 A1 Oct. 14, 2021

Related U.S. Application Data

(63) Continuation of application No. 16/459,059, filed on Jul. 1, 2019, now Pat. No. 11,021,400, which is a continuation of application No. 15/715,443, filed on Sep. 26, 2017, now Pat. No. 10,370,299, which is a continuation of application No. 15/181,786, filed on Jun. 14, 2016, now Pat. No. 9,771,304.

(60) Provisional application No. 62/343,685, filed on May 31, 2016, provisional application No. 62/175,873, filed on Jun. 15, 2015.

(51) Int. Cl.
| | |
|---|---|
| *C04B 35/48* | (2006.01) |
| *C04B 35/26* | (2006.01) |
| *C04B 35/624* | (2006.01) |
| *C04B 35/626* | (2006.01) |
| *C04B 35/64* | (2006.01) |
| *C04B 35/645* | (2006.01) |
| *C04B 41/00* | (2006.01) |
| *C04B 41/80* | (2006.01) |
| *H01P 1/208* | (2006.01) |
| *H01P 1/36* | (2006.01) |
| *H01P 1/38* | (2006.01) |
| *H01P 11/00* | (2006.01) |

(52) U.S. Cl.
CPC .......... *C04B 35/48* (2013.01); *C04B 35/2641* (2013.01); *C04B 35/2675* (2013.01); *C04B 35/624* (2013.01); *C04B 35/6261* (2013.01); *C04B 35/6262* (2013.01); *C04B 35/62655* (2013.01); *C04B 35/62675* (2013.01); *C04B 35/64* (2013.01); *C04B 35/645* (2013.01); *C04B 41/0027* (2013.01); *C04B 41/009* (2013.01); *C04B 41/80* (2013.01); *C04B 2235/3208* (2013.01); *C04B 2235/3224* (2013.01); *C04B 2235/3225* (2013.01); *C04B 2235/3239* (2013.01); *C04B 2235/3244* (2013.01); *C04B 2235/3248* (2013.01); *C04B 2235/3255* (2013.01); *C04B 2235/3256* (2013.01); *C04B 2235/3272* (2013.01); *C04B 2235/3274* (2013.01); *C04B 2235/3286* (2013.01); *C04B 2235/3294* (2013.01); *C04B 2235/3298* (2013.01); *C04B 2235/442* (2013.01); *C04B 2235/5427* (2013.01); *C04B 2235/5436* (2013.01); *C04B 2235/5445* (2013.01); *C04B 2235/5454* (2013.01); *C04B 2235/604* (2013.01); *C04B 2235/608* (2013.01); *C04B 2235/77* (2013.01); *C04B 2235/79* (2013.01); *H01P 1/2084* (2013.01); *H01P 1/36* (2013.01); *H01P 1/38* (2013.01); *H01P 11/008* (2013.01)

(58) Field of Classification Search
CPC . C04B 35/48; C04B 35/2641; C04B 35/2675; C04B 2235/2235; C04B 2235/3208; C04B 2235/3224; C04B 2235/3225; C04B 2235/3274; C04B 2235/3298
See application file for complete search history.

(56) References Cited

U.S. PATENT DOCUMENTS

| | | | |
|---|---|---|---|
| 3,654,162 | A | 4/1972 | Buhrer |
| 5,021,302 | A | 6/1991 | Brandle, Jr. et al. |
| 5,835,257 | A | 11/1998 | Itoh et al. |
| 9,303,333 | B2 | 4/2016 | Oosumi et al. |
| 9,771,304 | B2 | 9/2017 | Cruickshank et al. |
| 10,370,299 | B2 | 8/2019 | Cruickshank et al. |
| 11,021,400 | B2 | 6/2021 | Cruickshank et al. |
| 2001/0052828 | A1 | 12/2001 | Sato et al. |
| 2009/0260861 | A1 | 10/2009 | Nakajima et al. |
| 2012/0133452 | A1 | 5/2012 | Cruickshank et al. |
| 2013/0050041 | A1* | 2/2013 | Cruickshank ........... H01F 10/24 333/1.1 |
| 2013/0224500 | A1 | 8/2013 | Oosumi et al. |
| 2014/0021418 | A1* | 1/2014 | Shiroki ................... C30B 29/34 252/582 |
| 2019/0237840 | A1 | 8/2019 | Cruickshank et al. |
| 2019/0389773 | A1 | 12/2019 | Cruickshank et al. |

FOREIGN PATENT DOCUMENTS

| | | |
|---|---|---|
| CN | 102976729 | 3/2013 |
| CN | 103011810 | 4/2013 |

(Continued)

OTHER PUBLICATIONS

Gasgnier et al., "Rare earth iron garnets and rare earth iron binary oxides synthesized by microwave monomode", Journal of Alloys and Compounds 275-277:41-45 (1998).

(Continued)

*Primary Examiner* — Elizabeth A. Bolden

(74) *Attorney, Agent, or Firm* — Knobbe, Martens, Olson & Bear, LLP

(57) ABSTRACT

Disclosed are embodiments of synthetic garnet materials for use in radiofrequency applications. In some embodiments, increased amounts of bismuth can be added into specific sites in the crystal structure of the synthetic garnet in order to boost certain properties, such as the dielectric constant and magnetization. Accordingly, embodiments of the disclosed materials can be used in high frequency applications, such as in base station antennas.

21 Claims, 15 Drawing Sheets

(56) References Cited

FOREIGN PATENT DOCUMENTS

| CN | 103649384 | 3/2014 |
|---|---|---|
| EP | 2851354 | 3/2015 |
| GB | 1178023 | 1/1970 |
| GB | 1270663 | 4/1972 |
| GB | 1424861 | 2/1976 |
| JP | S60-145990 | 8/1985 |
| JP | S60-147108 | 8/1985 |
| JP | 2007-165668 | 6/2007 |
| JP | 2009-013059 | 1/2009 |
| JP | 2009-091214 | 4/2009 |
| JP | 2011-011944 | 1/2011 |
| JP | 2013-095608 | 5/2013 |
| JP | 2014-518840 | 8/2014 |
| JP | 2015-061081 | 3/2015 |
| WO | WO 2012/170259 | 12/2012 |

OTHER PUBLICATIONS

Office Action for Japanese Application No. 2016-117873, dated Nov. 26, 2019, in 8 pages.
Office Action for Chinese Application No. 201610424567.0, dated Jul. 14, 2020, in 7 pages.

* cited by examiner

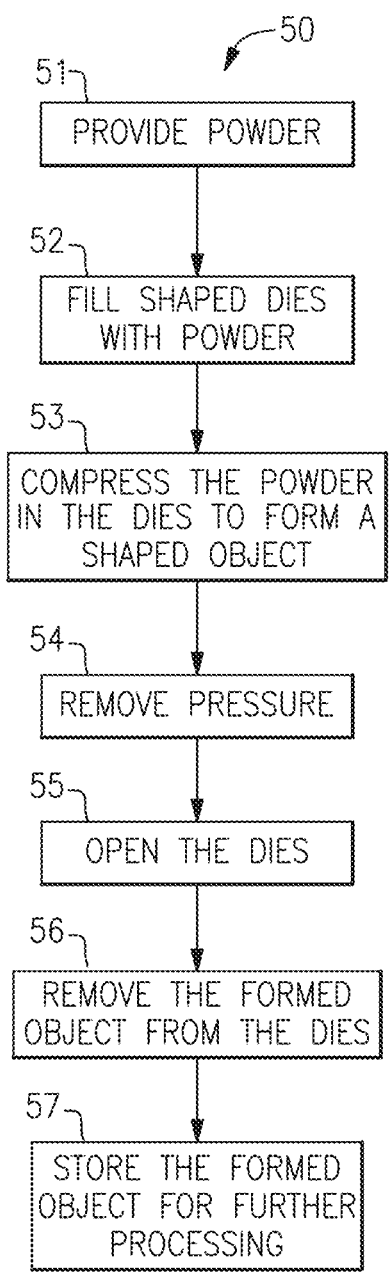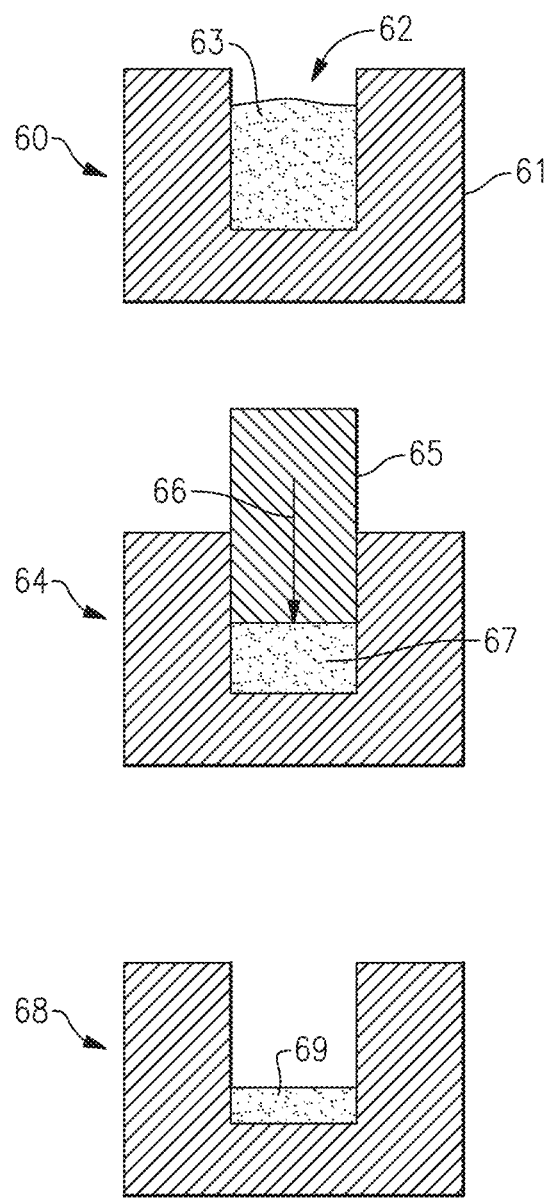
FIG. 10
FIG. 11

ULTRA-HIGH DIELECTRIC CONSTANT GARNET

INCORPORATION BY REFERENCE TO ANY PRIORITY APPLICATIONS

This application is a continuation of U.S. patent application Ser. No. 16/459,059, filed Jul. 1, 2019, which is a continuation of U.S. patent application Ser. No. 15/715,443, filed Sep. 26, 2017, titled "ULTRA-HIGH DIELECTRIC CONSTANT GARNET", which is a continuation of U.S. patent application Ser. No. 15/181,786, filed Jun. 14, 2016, titled "ULTRA-HIGH DIELECTRIC CONSTANT GARNET", which claims from the benefit of U.S. Provisional Application No. 62/175,873, filed Jun. 15, 2015, titled "ULTRA HIGH DIELECTRIC CONSTANT GARNET" and U.S. Provisional Application No. 62/343,685, filed May 31, 2016, titled "ULTRA-HIGH DIELECTRIC CONSTANT GARNET," the entirety of each of which is incorporated herein by reference.

BACKGROUND

Field

The present disclosure generally relates to modified garnets having an ultra-high dielectric constant, and applications of such modified garnets.

Description of the Related Art

Various crystalline materials with magnetic properties have been used as components in electronic devices such as cellular phones, biomedical devices, and RFID sensors. Garnets are crystalline materials with ferrimagnetic properties particularly useful in RF electronics operating in the lower frequency portions of the microwave region. Many microwave magnetic materials are derivatives of Yttrium Iron Garnet (YIG), a synthetic form of garnet widely used in various telecommunication devices largely because of its favorable magnetic properties such as narrow linewidth at its ferromagnetic resonance frequency. YIG is generally composed of yttrium, iron, and oxygen, and is possibly doped with one or more other rare earth metals such as lanthanides or scandium.

SUMMARY

Disclosed herein are embodiments of a synthetic garnet material comprising a structure including dodecahedral sites, bismuth occupying at least some of the dodecahedral sites, the garnet material having a dielectric constant value of at least 31.

In some embodiments, the 3 dB linewidth can be less than 100. In some embodiments, the 3 dB linewidth can be less than 80.

In some embodiments, the structure can include gadolinium. In some embodiments, the structure can include gadolinium in a level up to 1.0 units. In some embodiments, the synthetic garnet material may not include sillenite as a second phase. In some embodiments, the structure can contain at least 1.4 units of bismuth. In some embodiments, the structure can contain between 1.4 and 2.5 units of bismuth. In some embodiments, the synthetic garnet material can have a dielectric constant of at least 34.

Also disclosed herein are embodiments of a synthetic garnet material comprising a structure containing at least 1.4 units of bismuth occupying the dodecahedral sites.

In some embodiments, the synthetic garnet material can have a dielectric constant of at least 34. In some embodiments, the synthetic garnet material can have a dielectric constant of at least 36. In some embodiments, the structure can contain between 1.4 and 2.5 units of bismuth. In some embodiments, the garnet material can have a magnetization of 1900 or above.

Also disclosed herein are embodiments of a modified synthetic garnet composition represented by the formula: $Bi_xCa_yGd_zY_{3-x-y-z}Fe_{5-y}Zr_yO_{12}$. In some embodiments, $0<x<2.5$, $0<y<1.0$ and $0<z<1.0$. In some embodiments, $0<x<2.5$, $0<y<1.0$ and $0<z<2.0$. In some embodiments, the modified synthetic garnet composition can have a dielectric constant of at least 34. In some embodiments, the 3 dB linewidth can be less than 80.

Also disclosed herein are embodiments of a method of manufacturing a synthetic garnet having a high dielectric constant, the method comprising providing a yttrium iron garnet structure, inserting greater than 1.4 units of bismuth into the iron garnet structure to form a modified synthetic garnet structure without sillenite.

In some embodiments, the modified synthetic garnet can have a composition of $Bi_xCa_yGd_zY_{3-x-y-z}Fe_{5-y}Zr_yO_{12}$, $0<x<2.5$, $0<y<1.0$ and $0<z<1.0$. In some embodiments, $0<x<2.5$, $0<y<1.0$ and $0<z<2.0$. In some embodiments, the modified synthetic garnet can have a dielectric constant of at least 34. In some embodiments, the modified synthetic garnet can have 3 dB linewidth of less than 80.

BRIEF DESCRIPTION OF THE DRAWINGS

FIG. 10 shows a process that can be implemented to form a shaped object from powder material described herein.

FIG. 11 shows examples of various stages of the process of FIG. 10.

DETAILED DESCRIPTION

Disclosed herein are embodiments of synthetic garnets (or generally ferrites/ferrite garnets), methods of manufacturing them, and application so such synthetic garnets. In particular, an excess amount of bismuth atoms can be incorporated into the garnet lattice structure in order to increase the overall dielectric constant of the material without experiencing deleterious effects to other magnetic or electrical aspects of the garnet. In particular, bismuth substituted ferromagnetic garnets may show enhanced dielectric constants as a sintered ceramic, making them especially useful for miniaturizing isolators and circulators in commercial wireless infrastructure devices, thereby reducing the overall footprint of the devices. Further, the materials can maintain high magnetization, making them ideal for high frequency applications in ranges that have not be feasible before.

Figure 1:
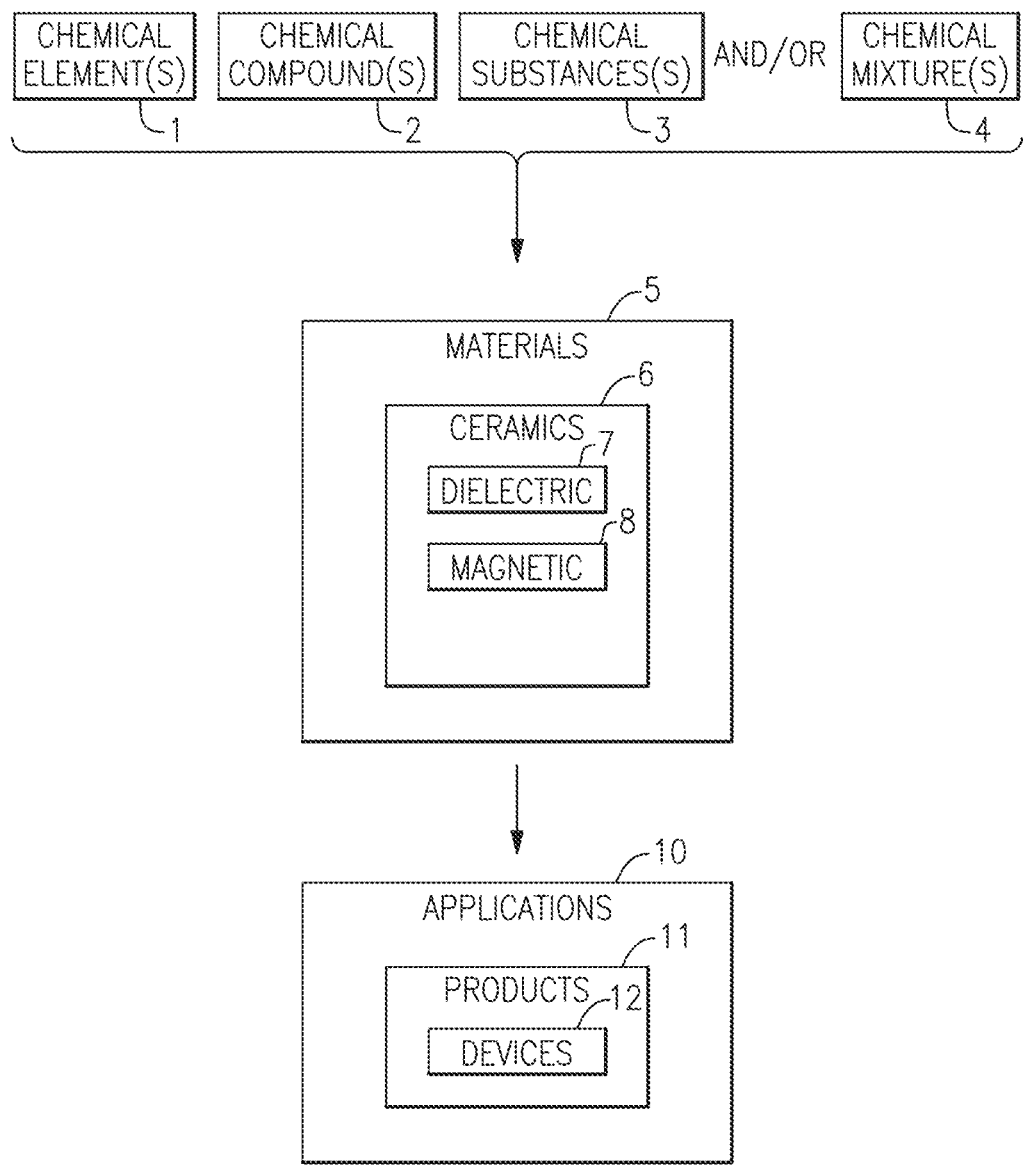
FIG. 1 schematically shows how materials having one or more features described herein can be designed, fabricated, and used.

FIG. 1 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into ceramic materials (block 6) configured to include a desirable dielectric property (block 7), a magnetic property (block 8) and/or an advanced material property (block 9).

In some embodiments, a material having one or more of the foregoing properties can be implemented in applications (block 10) such as radio-frequency (RF) application. Such applications can include implementations of one or more features as described herein in devices 12. In some applications, such devices can further be implemented in products 11. Examples of such devices and/or products are described herein.

Synthetic Garnets

Disclosed herein are methods of modifying synthetic garnet compositions, such as Yttrium Iron Garnet (YIG), to increase the dielectric constant of the material. However, it will be understood that other synthetic garnets, such as yttrium aluminum garnet or gadolinium gallium garnet, can be used as well, and the particular garnet is not limiting. Also disclosed herein are synthetic garnet materials having high dielectric constant (and/or other advantageous properties), methods of producing the materials, and the devices and systems incorporating such materials.

Figure 2:
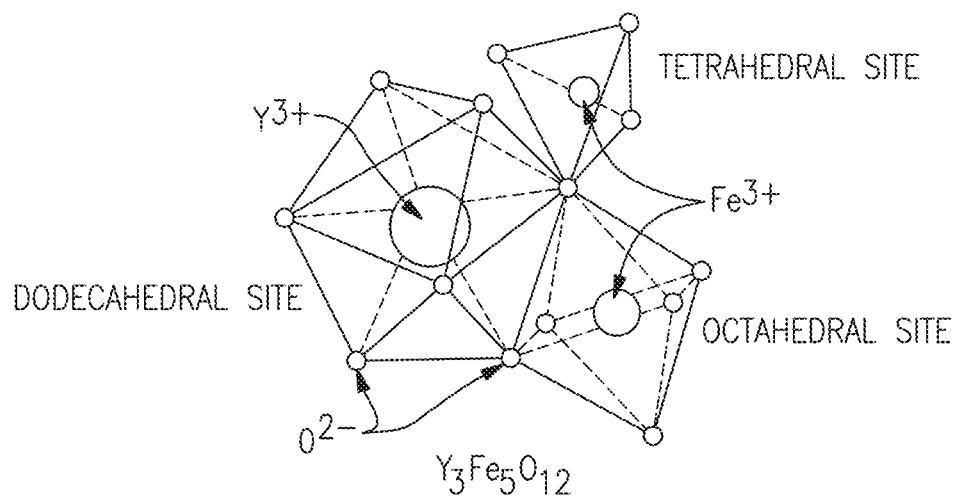
FIG. 2 depicts an yttrium based garnet crystal lattice structure.

Synthetic garnets typically have the formula unit of $A_3B_5O_{12}$, where A and B are trivalent metal ions. Yttrium Iron Garnet (YIG) is a synthetic garnet having the formula unit of $Y_3Fe_5O_{12}$, which includes Yttrium (Y) in the 3+ oxidation state and Iron (Fe) in the 3+ oxidation state. The general crystal structure of a YIG formula unit is depicted in FIG. 2. As shown in FIG. 2, YIG has a dodecahederal site, an octahedral site, and a tetrahedral site. The Y ions occupy the dodecahedral site while the Fe ions occupy the octahedral and tetrahedral sites. Each YIG unit cell, which is cubic in crystal classifications, has eight of these formula units.

The modified synthetic garnet compositions, in some embodiments, involve substituting some or all of the Yttrium (Y) in the Yttrium Iron Garnet (YIG) with one or a combination of other ions such that the resulting material maintains or increases desirable magnetic properties for microwave (or other) applications, for example high dielectric constants. There have been past attempts toward doping YIG with different ions to modify the material properties. Some of these attempts, such as Bismuth (Bi) doped YIG, are described in "Microwave Materials for Wireless Applications" by D. B. Cruickshank, which is hereby incorporated by reference in its entirety. However, in practice ions used as substitutes may not behave predictably because of, for example, spin canting induced by the magnetic ion itself or by the effect of non-magnetic ions on the environment adjacent magnetic ions, reducing the degree alignment. Thus, the resulting magnetic properties cannot be predicted. Additionally, the amount of substitution is limited in some cases. Beyond a certain limit, the ion will not enter its preferred lattice site and either remains on the outside in a second phase compound or leaks into another site. Additionally, ion size and crystallographic orientation preferences may compete at high substitution levels, or substituting ions are influenced by the ion size and coordination of ions on other sites. As such, the assumption that the net magnetic behavior is the sum of independent sub-lattices or single ion anisotropy may not always apply in predicting magnetic properties.

Considerations in selecting an effective substitution of rare earth metals in YIG for microwave magnetic applications include the optimization of the density, the magnetic resonance linewidth, the saturation magnetization, the Curie temperature, the dielectric constant of the material, and the dielectric loss tangent in the resulting modified crystal structure. Magnetic resonance is derived from spinning electrons, which when excited by an appropriate radio frequency (RF) will show resonance proportional to an applied magnetic field and the frequency. The width of the resonance peak is usually defined at the half power points and is referred to as the magnetic resonance linewidth. It is generally advantageous for the material to have a low linewidth because low linewidth manifests itself as low magnetic loss, which is required for all low insertion loss ferrite devices. The modified garnet compositions according to preferred embodiments of the present invention provide single crystal or polycrystalline materials with reduced Yttrium content and yet maintaining low linewidth and other desirable properties for microwave magnetic applications.

In some embodiments, a Yttrium based garnet is modified by substituting Bismuth ($Bi^{3+}$) for some of the Yttrium ($Y^{3+}$) on the dodecahedral sites of the garnet structure in combination with introducing one or more ions, such as divalent (+2), trivalent (+3), tetravalent (+4), pentavalent (+5) or hexavalent (+6) non-magnetic ions to the octahedral sites of the structure to replace at least some of the Iron ($Fe^{3+}$). In some embodiments, one or more high valency non-magnetic ions such as Zirconium ($Zr^{4+}$) or Niobium ($Nb^{5+}$) can be introduced to the octahedral sites.

In some embodiments, a Yttrium based garnet is modified by introducing one or more high valency ions with an oxidation state greater than 3+ to the octahedral or tetrahedral sites of the garnet structure in combination with substituting Calcium ($Ca^{2+}$) for Yttrium ($Y^{3+}$) in the dodecahedral site of the structure for charge compensation induced by the high valency ions, hence reducing the $Y^{3+}$ content. When non-trivalent ions are introduced, valency balance is maintained by introducing, for example, divalent Calcium ($Ca^{2+}$) to balance the non-trivalent ions. For example, for each 4+ ion introduced to the octahedral or tetrahedral sites, one $Y^{3+}$ ion can be substituted with a $Ca^{2+}$ ion. For each 5+ ion, two $Y^{3+}$ ions can be replaced by $Ca^{2+}$ ions. For each 6+ ion, three $Y^{3+}$ ions can be replaced by $Ca^{2+}$ ions. For each 6+ ion, three Y3+ ions can be replaced by $Ca^{2+}$ ions. In one embodiment, one or more high valence ions selected from the group consisting of $Zr^{4+}$, $Sn^{4+}$, $Ti^{4+}$, $Nb^{5+}$, $Ta^{5+}$, $Sb^{5+}$, $W^{6+}$, and $Mo^{6+}$ is introduced to the octahedral or tetrahedral sites, and divalent Calcium ($Ca^{2+}$) is used to balance the charges, which in turn reduces Y3+ content.

In some embodiments, a Yttrium based garnet is modified by introducing one or more high valency ions, such as Vanadium ($V^{5+}$), to the tetrahedral site of the garnet structure to substitute for $Fe^{3+}$ to further reduce the magnetic resonance linewidth of the resulting material. Without being bound by any theory, it is believed that the mechanism of ion substitution causes reduced magnetization of the tetrahedral site of the lattice, which results in higher net magnetization of the garnet, and by changing the magnetocrystalline environment of the ferric ions also reduces anisotropy and hence the ferromagnetic linewidth of the material.

In some embodiments, a combination of high Bismuth (Bi) doping combined with Vanadium (V) and/or Zirconium (Zr) induced Calcium (Ca) valency compensation could effectively displace all or most of the Yttrium (Y) in microwave device garnets. Further, certain other high valency ions could also be used on the tetrahedral of octahedral sites and that a fairly high level of octahedral substitution in the garnet structure is preferred in order to obtain minimized magnetic resonance linewidth. Moreover, Yttrium displacement can be accomplished by adding Calcium in addition to Bismuth to the dodecahedral site. Doping the octahedral or tetrahedral sites with higher valency ions, preferably greater than 3+, could allow more Calcium to be introduced to the dodecahedral site to compensate for the charges, which in turn would result in further reduction of Yttrium content.

Modified Synthetic Garnet Compositions

Disclosed herein are modified synthetic garnets having very high dielectric constants, while additionally having high magnetization levels, making them particularly useful for high frequency applications. In particular, increased amount of Bismuth, along with balancing charges from other elements, can be added into the crystal structure in order to improve the magnetoelectric properties of the garnet while not reducing other magnetoelectric properties.

In some embodiments, the modified synthetic garnet composition can be defined by a general composition: $Bi_xCa_yGd_zY_{3-x-y-z}Fe_{5-y}Zr_yO_{12}$, where $0 \leq x \leq 2.5$, $0 \leq y \leq 1.0$ and $0 \leq z \leq 1.0$. In some embodiments, $0 \leq x \leq 2.5$, $0 \leq y \leq 1.0$ and $0 \leq z \leq 2.0$. In some embodiments, $1.0 < x < 2.0$, $0.1 < y < 0.8$, and $0.2 < z < 1.9$. However, some embodiments of the disclosure may not be defined by the above composition.

In some embodiments, about 1.4 formula units of Bismuth (Bi) can be substituted for some of the Yttrium (Y) on the dodecahedral site. In some embodiments, greater than about 1.4 formula units of Bismuth (Bi) can be substituted for some of the Yttrium (Y) on the dodecahedral site. In some embodiments, between about 1.4 and about 2.5 formula units of Bismuth (Bi) can be substituted for some of the Yttrium (Y) on the dodecahedral site. In some embodiments, up to 3.0 formula units of Bismuth (Bi) can be substituted for some of the Yttrium (Y) on the dodecahedral site. The high levels of Bismuth, which can results in advantageous properties, can be achieved through certain atom inclusions and methods of manufacturing, as discussed below.

Additionally, as shown for example in the above formula, charge balance can be achieved by Calcium (Ca) or Zirconium (Zr) substituting for some or all of the remaining Yttrium (Y). In some embodiments, equivalent amounts of Ca and Zr are added to maintain charge stability as Ca has a formal charge of +2 and Zr has a formal charge of +4. Further, in order to balance the different stresses on the structure caused by the inclusion of Bismuth (Bi), Gadolinium (Gd), or other large rare earth ions, can be incorporated into the dodecahedral site of the garnet structure. For example, Gd may be added to replace the Y, which can improve temperature stability. Further, the Gd itself can increase the dielectric constant.

Tables 1 below illustrates a list of different synthetic garnet compositions, as well as their manufacturing parameters. Further, Table 2 discloses the corresponding properties achieved by the compositions of Table 1.

TABLE 1 illustrates a list of compositions and manufacturing parameters

| No. | Composition |
|---|---|
| 1. | $Bi_{1.6}Ca_{.65}Y_{.79}Fe_{4.29}Zr_{.65}O_{11.97}$ 950° C./72 h |
| 2. | $Bi_{1.6}Ca_{.65}Y_{.79}Fe_{4.29}Zr_{.65}O_{11.97}$ 895° C./100 h |
| 3. | $Bi_{1.6}Ca_{.65}Gd_{.79}Fe_{4.29}Zr_{.65}O_{11.97}$ 950° C./72 h |
| 4. | $Bi_{1.6}Ca_{.65}Gd_{.79}Fe_{4.29}Zr_{.65}O_{11.97}$ 895° C./100 h |
| 5. | $Bi_{1.9}Ca_{.65}Gd_{.45}Fe_{4.35}Zr_{.65}O_{12}$ 900° C./100 h |
| 6. | $Bi_{1.9}Ca_{.65}Gd_{.45}Fe_{4.35}Zr_{.65}O_{12}$ 900° C./100 h |
| 7. | $Bi_{1.9}Ca_{.65}Gd_{.45}Fe_{4.35}Zr_{.65}O_{12}$ 895° C./100 h |
| 8. | $Bi_{1.9}Ca_{.65}Gd_{.45}Fe_{4.35}Zr_{.65}O_{12}$ 895° C./100 h |
| 9. | $Bi_{1.9}Ca_{.65}Gd_{.45}Fe_{4.35}Zr_{.65}O_{12}$ |

TABLE 2 illustrates properties for the compositions of Table 1

| No. | Magnetization ($4\pi M_s$) (Gauss) | 3 dB Linewidth (Oersted) | Curie Temp | Dielectric Constant | 9 GHz Dielectric Loss Tangent | Phases Present | Density (gkc) |
|---|---|---|---|---|---|---|---|
| 1. | 1784 | 98 | | 33.47 | .00306 | Garnet | 6.007 |
| 2. | 1812 | 97 | 184 | 34.12 | .00290 | Garnet | 6.079 |
| 3. | 1614 | 69 | 183 | 34.59 | .00265 | Garnet | 6.383 |
| 4. | 1596 | 57 | 179 | 33.89 | .00274 | Garnet | 6.379 |
| 5. | 1052 | 505 | 133 | 39.2 | .00075 | Garnet Perovskite Likely sillenite | 6.421 |

TABLE 2-continued illustrates properties for the compositions of Table 1

| No. | Magnetization ($4\pi M_s$) (Gauss) | 3 dB Linewidth (Oersted) | Curie Temp | Dielectric Constant | 9 GHz Dielectric Loss Tangent | Phases Present | Density (gkc) |
|---|---|---|---|---|---|---|---|
| 6. | 1091 | 370 | 158 | 40.6 | .00166 | Garnet Perovskite Likely sillenite | 6.534 |
| 7. | 1072 | 347 | | 37.59 | .00260 | Unknown | 6.459 |
| 8. | 1893 | 316 | | | | Unknown | 6.322 |
| 9. | 1050 | 503 | | 40.74 | .00223 | Garnet Perovskite | 6.492 |

As shown in the above table, using embodiments of the disclosed synthetic garnet, very high dielectric constants can be achieved. For example, in some embodiments, the dielectric constant of the synthetic can be greater than or equal to 31, 33, 35, 37, 39, or 40. Further, the 3 dB linewidth can be minimized, with some embodiments having below 100, 90, 80, 70, or 60.

The insertion of Bismuth into the garnet structure can cause significant lattice distortion in the garnet structure due to the size of the Bismuth being greater than the size of the Yttrium it is replacing. Generally, there is only so much Bismuth that can be inserted into the garnet structure before the garnet structure decomposes, rendering it less useful for radiofrequency applications. For example, if too much Bismuth is added into the garnet structure, the structure will reject the Bismuth, and a Bismuth rich phase, known as sillenite, will form. When sillenite forms, the 3 dB linewidth of the material can greatly increase, such as shown in the above Table 2, thus making the material difficult for radiofrequency applications.

Sillenite is a structure that is very rich in Bismuth and tends to form at the grain boundaries. While the sillenite may not always be detected, as it may form a glass or have poor crystallinity, the 3 dB linewidth usually drastically increases with sillenite, and thus the presence of sillenite can be assumed with significantly high 3 dB linewidths, such as shown in compositions 5 and 6 above. Further, anomalously high dielectric constants lead to the assumption that sillenite is present. In addition large 3 dB linewidths may be the result of a defect garnet structure that has oxygen or cation vacancies.

Due to the difficulty of inserting excess Bismuth into the garnet, other atoms can be inserted to act as a chemical shim to open up the structure. For example, Gadolinium (Gd) atoms can be substituted into the structure, and, due to the greater size of the Gadolinium atoms, a more stable garnet structure can be formed with higher Bismuth contents, allowing for improved properties such as the dielectric constant. Gadolinium, in particular, can have useful magnetic and radiofrequency properties. For example, Gadolinium is not a fast relaxer, unlike other rare earth atoms. Fast relaxers will increase the 3 dB linewidth, due to their stable 7f or 4f electron shells. However, Gadolinium can be used without causing substantial increases in linewidth.

Other large atoms could be used as well instead of Gadolinium, for example: La, Pr, Nd, Sm, Dy, Yb and Ho. Some of these are fast relaxers and may increase the 3 dB linewidth.

Table III illustrates further synthetic garnet compositions that can be formed using increased amounts of Bismuth in the crystal structure of the garnet, along with their respective properties. In some embodiments, Hafnium (Hf) and Titanium (Ti) can be incorporated into the octahedral sites of the lattice. Furthermore, rare earth ions (such as La, Ce, Pr, Nd, Sm, Eu, Dy, Tb, Ho, Er, Tm, Lu and Yb) along with smaller ions (such Mn, In, Sc, Zr, Hf Zn, and Mg) can both be incorporated into the dodecahedral site of the garnet structure. In some cases the total charge may need to be balanced with other substitutions.

TABLE III

Compositions and properties of synthetic garnets

| Composition | Fired Density (g/cc) | 3 dB Line width | Magnetization | Dielectric Constant | Dielectric Loss | Curie Temp. |
|---|---|---|---|---|---|---|
| $Bi_{1.4}Ca_{.55}Y_{1.05}Fe_{4.45}Ti_{.55}O_{12}$ | | | | | | |
| $Bi_{1.4}Ca_{.55}Y_{1.05}Fe_{4.45}Zr_{.495}Ti_{.055}O_{12}$ | 5.439 | 412 | 1296 | 30.65 | 0.00324 | 133.93 |
| $Bi_{1.4}Ca_{.55}Y_{1.05}Fe_{4.45}Zr_{.44}Ti_{.11}O_{12}$ | 5.142 | 749 | 1175 | | | 142.19 |
| $Bi_{1.4}Ca_{.55}Y_{1.05}Fe_{4.45}Zr_{.385}Ti_{.165}O_{12}$ | | | | | | 128.6 |
| $Bi_{1.4}Ca_{.55}Y_{1.05}Fe_{4.45}Zr_{.33}Ti_{.22}O_{12}$ | | | | | | 150.67 |
| $Bi_{1.4}Ca_{.53}Y_{1.07}Fe_{4.45}Ti_{.53}O_{11.97}$ | 5.849 | 525 | 1501 | 39.38 | 0.00233 | |
| $Bi_{1.4}Sr_{.53}Y_{1.07}Fe_{4.45}Ti_{.53}O_{11.97}$ | 5.655 | 865 | 1512 | 27.21 | 0.00283 | |
| $Bi_{1.4}Ca_{.53}Y_{1.07}Fe_{4.45}Zr_{.26}Ti_{.27}O_{11.97}$ | 5.573 | 698 | 1422 | 36.86 | 0.00199 | |
| $Bi_{1.4}Ca_{.53}Y_{1.07}Fe_{4.45}Zr_{.477}Ti_{.053}O_{11.97}$ | 5.335 | 243 | 1745 | 26.67 | 0.00113 | |
| $Bi_{1.4}Ca_{.53}Y_{1.07}Fe_{4.45}Zr_{.424}Ti_{.106}O_{11.97}$ | 5.359 | 665 | 1596 | 19.18 | 0.00371 | |
| $Bi_{1.4}Ca_{.53}Y_{1.07}Fe_{4.45}Hf_{.53}O_{11.97}$ | 5.71 | 240 | 1767 | 25.86 | 0.00275 | |
| $Bi_{1.4}Ca_{.53}Y_{1.07}Fe_{4.45}Hf_{.424}Ti_{.106}O_{11.97}$ | 5.564 | | 1136 | 28.82 | 0.00167 | |
| $Bi_{1.4}Ca_{.26}Sr_{.27}Y_{1.07}Fe_{4.45}Zr_{.53}O_{11.97}$ | 5.326 | 848 | 1422 | 28 | 0.00329 | |
| $Bi_{1.4}Ca_{.26}Sr_{.27}Y_{1.07}Fe_{4.45}Zr_{.26}Ti_{.27}O_{11.97}$ | 4.639 | | 1001 | 26.2 | 0.00309 | |
| $Bi_{1.4}Ca_{.26}Sr_{.27}Gd_{1.07}Fe_{4.45}Zr_{.53}O_{11.97}$ | 5.676 | | 1165 | 29.13 | 0.00293 | |
| $Bi_{1.4}Ca_{.53}Y_{1.07}Fe_{4.45}Hf_{.53}O_{11.97}$ | 5.745 | 210 | 1793 | 25.28 | 0.0027 | |
| $Bi_{1.46}Ca_{.53}Y_{1.01}Fe_{4.45}Hf_{.53}O_{11.97}$ | 6.065 | 102 | 1884 | 29.41 | 0.00297 | |

TABLE III-continued

Compositions and properties of synthetic garnets

| Composition | Fired Density (g/cc) | 3 dB Line width | Magnetization | Dielectric Constant | Dielectric Loss | Curie Temp. |
|---|---|---|---|---|---|---|
| $Bi_{1.52}Ca_{.53}Y_{0.95}Fe_{4.45}Hf_{.53}O_{11.97}$ | 6.339 | 44 | 1961 | | | |
| $Bi_{1.58}Ca_{.53}Y_{0.89}Fe_{4.45}Hf_{.53}O_{11.97}$ | 6.411 | 59 | 1951 | | | |
| $Bi_{1.64}Ca_{.53}Y_{0.83}Fe_{4.45}Hf_{.53}O_{11.97}$ | 6.47 | 124 | 1859 | | | |
| $Bi_{1.7}Ca_{.53}Y_{0.77}Fe_{4.45}Hf_{.53}O_{11.97}$ | 6.53 | | 1624 | 35.33 | 0.00294 | |
| $Bi_{1.76}Ca_{.53}Y_{0.71}Fe_{4.45}Hf_{.53}O_{11.97}$ | 6.585 | 365 | 1528 | 36.04 | 0.00281 | |
| $Bi_{1.82}Ca_{.53}Y_{0.65}Fe_{4.45}Hf_{.53}O_{11.97}$ | 6.64 | 204 | 1760 | 38.03 | 0.00267 | |
| $Bi_{1.88}Ca_{.53}Y_{0.59}Fe_{4.45}Hf_{.53}O_{11.97}$ | 6.697 | 447 | 1407 | 38.12 | 0.00254 | |
| $Bi_{1.94}Ca_{.53}Y_{0.53}Fe_{4.45}Hf_{.53}O_{11.97}$ | 6.751 | | 1334 | 38.99 | 0.00216 | |
| $Bi_{1.75}Ca_{.55}Gd_{0.7}Fe_{4.43}Zr_{.55}O_{11.97}$ | 6.545 | 281 | 1376 | 38.79 | 0.00261 | |
| $Bi_{1.50}Ca_{.55}Gd_{0.95}Fe_{4.43}Zr_{.55}O_{11.97}$ | 6.374 | 39 | 1627 | 33.56 | 0.00066 | |
| $Bi_{1.50}Ca_{.55}Gd_{0.95}Fe_{4.43}Zr_{.55}O_{11.97}$ | 6.397 | 22 | 1648 | | | |
| $Bi_{1.60}Ca_{.65}Gd_{0.75}Fe_{4.33}Zr_{.65}O_{11.97}$ | 6.353 | 52 | 1592 | 35.62 | 0.00208 | |
| $Bi_{1.60}Ca_{.65}Gd_{0.75}Fe_{4.33}Zr_{.65}O_{11.97}$ | 6.359 | 51 | 1609 | | | |
| $Bi_{1.75}Ca_{.55}Gd_{0.7}Fe_{4.43}Zr_{.55}O_{11.97}$ | 6.545 | 275 | 1387 | 39.2 | 0.00246 | 183.66 |
| $Bi_{1.70}Ca_{.55}Gd_{0.75}Fe_{4.43}Zr_{.55}O_{11.97}$ | 6.497 | 186 | 1468 | 36.85 | 0.00273 | 186.15 |
| $Bi_{1.72}Ca_{.57}Gd_{0.71}Fe_{4.41}Zr_{.57}O_{11.97}$ | 6.53 | 259 | 1384 | 38.4 | 0.00254 | 183.08 |
| $Bi_{1.65}Ca_{.55}Gd_{0.80}Fe_{4.43}Zr_{.55}O_{11.97}$ | 6.49 | 156 | 1515 | 37.1 | 0.00275 | 193.41 |
| $Bi_{1.67}Ca_{.57}Gd_{0.76}Fe_{4.41}Zr_{.57}O_{11.97}$ | 6.476 | 166 | 1505 | 36.89 | 0.00268 | 188.38 |
| $Bi_{1.69}Ca_{.59}Gd_{0.72}Fe_{4.39}Zr_{.59}O_{11.97}$ | 6.519 | 265 | 1404 | 38.15 | 0.00263 | 189.92 |
| $Bi_{1.60}Ca_{.55}Gd_{0.85}Fe_{4.43}Zr_{.55}O_{11.97}$ | 6.461 | 97 | 1582 | 35.46 | 0.00287 | 196.13 |
| $Bi_{1.62}Ca_{.57}Gd_{0.81}Fe_{4.41}Zr_{.57}O_{11.97}$ | 6.451 | 114 | 1562 | 35.9 | 0.00283 | 191.01 |
| $Bi_{1.64}Ca_{.59}Gd_{0.77}Fe_{4.39}Zr_{.59}O_{11.97}$ | 6.437 | 124 | 1551 | 35.94 | 0.00281 | 186.49 |
| $Bi_{1.66}Ca_{.61}Gd_{0.73}Fe_{4.37}Zr_{.61}O_{11.97}$ | 6.449 | 148 | 1508 | 36.15 | 0.00278 | 174.22 |
| $Bi_{1.55}Ca_{.55}Gd_{0.90}Fe_{4.43}Zr_{.55}O_{11.97}$ | 6.417 | 37 | 1634 | 34.79 | 0.00224 | 202 |
| $Bi_{1.57}Ca_{.57}Gd_{0.86}Fe_{4.46}Zr_{.57}O_{11.97}$ | 6.418 | 50 | 1625 | 35.31 | 0.00283 | 190.33 |
| $Bi_{1.59}Ca_{.59}Gd_{0.82}Fe_{4.49}Zr_{.59}O_{11.97}$ | 6.425 | 67 | 1612 | 35.61 | 0.00286 | 189.38 |
| $Bi_{1.61}Ca_{.61}Gd_{0.78}Fe_{4.47}Zr_{.61}O_{11.97}$ | 6.419 | 86 | 1579 | 35.97 | 0.00281 | 180.05 |
| $Bi_{1.63}Ca_{.63}Gd_{0.74}Fe_{4.35}Zr_{.63}O_{11.97}$ | 6.414 | 104 | 1521 | 36.21 | 0.00282 | 171.64 |
| $Bi_{1.50}Ca_{.55}Gd_{0.95}Fe_{4.43}Zr_{.55}O_{11.97}$ | 6.403 | 31 | 1649 | 33.94 | 0.00068 | 200.89 |
| $Bi_{1.52}Ca_{.57}Gd_{0.91}Fe_{4.41}Zr_{.57}O_{11.97}$ | 6.397 | 33 | 1665 | 33.79 | 0.00086 | 195.26 |
| $Bi_{1.54}Ca_{.59}Gd_{0.87}Fe_{4.39}Zr_{.59}O_{11.97}$ | 6.392 | 31 | 1665 | 34.24 | 0.0008 | 186.62 |
| $Bi_{1.56}Ca_{.61}Gd_{0.83}Fe_{4.37}Zr_{.61}O_{11.97}$ | 6.383 | 51 | 1648 | 34.89 | 0.00082 | 189.99 |
| $Bi_{1.58}Ca_{.63}Gd_{0.79}Fe_{4.35}Zr_{.63}O_{11.97}$ | 6.381 | 39 | 1637 | 35.99 | 0.00161 | 179.54 |
| $Bi_{1.60}Ca_{.65}Gd_{0.75}Fe_{4.33}Zr_{.65}O_{11.97}$ | 6.369 | 34 | 1634 | 35.24 | 0.00211 | 170.17 |
| $Bi_{1.4}Ca_{.6}InZn_{.6}Fe_{4.4}O_{12}$ | 6.047 | 443 | 1618 | 31.5 | 0.0032 | |
| $Bi_{1.4}Ca_{.6}InMg_{.6}Fe_{4.4}O_{12}$ | 5.885 | 422 | 1475 | 22.98 | 0.00421 | |
| $Yb_{1.4}In_{.35}Bi_{1.25}Fe_{5}O_{12}$ | 7.047 | 760 | 1167 | 30.49 | 0.00278 | |
| $Yb_{1.05}In_{.70}Bi_{1.25}Fe_{5}O_{12}$ | 6.939 | | 781 | 29.31 | 0.00051 | |
| $Yb_{.7}In_{1.05}Bi_{1.4}Fe_{5}O_{12}$ | 6.636 | 976 | 435 | 25.64 | 0.00378 | |
| $Yb_{.35}In_{1.4}Bi_{1.25}Fe_{5}O_{12}$ | 6.403 | | 142 | 22.68 | 0.00438 | |
| $In_{1.75}Bi_{1.25}Fe_{5}O_{12}$ | 5.963 | | 25 | 21.21 | 0.00468 | |
| $Bi_{1.32}Yb_{1.56}Ca_{.12}Zr_{.12}Fe_{4.88}O_{12}$ | 7.03 | 405 | 1612 | 30.43 | 0.00309 | |
| $Bi_{1.39}Yb_{1.37}Ca_{.24}Zr_{.24}Fe_{4.76}O_{12}$ | 6.912 | 255 | 1774 | 31.59 | 0.003 | |
| $Bi_{1.46}Yb_{1.18}Ca_{.36}Zr_{.36}Fe_{4.64}O_{12}$ | 6.78 | 187 | 1842 | 31.15 | 0.00315 | |
| $Bi_{1.53}Yb_{.99}Ca_{.48}Zr_{.48}Fe_{4.52}O_{12}$ | 6.623 | 183 | 1757 | 32.15 | 0.00297 | |
| $Bi_{1.6}Yb_{.8}Ca_{.6}Zr_{.6}Fe_{4.4}O_{12}$ | 6.486 | 381 | 1666 | 33.51 | 0.00306 | |
| $Bi_{1.32}In_{1.56}Ca_{.12}Zr_{.12}Fe_{4.88}O_{12}$ | 6.125 | | 27 | 26.13 | 0.00368 | |
| $Bi_{1.39}In_{1.37}Ca_{.24}Zr_{.24}Fe_{4.76}O_{12}$ | 6.097 | | 32 | 25.67 | 0.0028 | |
| $Bi_{1.46}In_{1.18}Ca_{.36}Zr_{.36}Fe_{4.64}O_{12}$ | 6.074 | | 37 | 26.48 | 0.00287 | |
| $Bi_{1.53}In_{.99}Ca_{.48}Zr_{.48}Fe_{4.52}O_{12}$ | 6.113 | | 41 | 27.82 | 0.00356 | |
| $Bi_{1.6}In_{.8}Ca_{.6}Zr_{.6}Fe_{4.4}O_{12}$ | 6.14 | | 43 | 30.76 | 0.00245 | |
| $Bi_{1.6}Yb_{.64}In_{.16}Ca_{.6}Zr_{.6}Fe_{4.4}O_{12}$ | 6.185 | 288 | 918 | 32.42 | 0.00313 | |
| $Bi_{1.6}Yb_{.48}In_{.32}Ca_{.6}Zr_{.6}Fe_{4.4}O_{12}$ | 6.293 | 327 | 584 | 33.29 | 0.00288 | |
| $Bi_{1.6}Yb_{.32}In_{.48}Ca_{.6}Zr_{.6}Fe_{4.4}O_{12}$ | 6.315 | 326 | 298 | 32.45 | 0.00228 | |
| $Bi_{1.6}Yb_{.16}In_{.64}Ca_{.6}Zr_{.6}Fe_{4.4}O_{12}$ | 6.217 | | 104 | 31.17 | 0.0028 | |
| $Bi_{1.52}Ca_{.53}Y_{0.95}Fe_{4.45}Hf_{.53}O_{11.97}$ | 6.315 | 42 | 1954 | 32.21 | 0.0014 | |
| $Bi_{1.58}Ca_{.53}Y_{0.89}Fe_{4.45}Hf_{.53}O_{11.97}$ | 6.401 | 58 | 1960 | 32.75 | 0.00292 | |
| $Bi_{1.64}Ca_{.53}Y_{0.83}Fe_{4.45}Hf_{.53}O_{11.97}$ | 6.446 | 129 | 1708 | 33.42 | 0.00302 | |

As shown in Table 3, additional elements can be used for the formation of synthetic garnets. For example, hafnium (Hf), strontium (Sr), Indium (In), or Ytterbium can be incorporated into the synthetic garnet for improved properties. The variations in the compositions can be partially due to varied charge balancing schemes. In some embodiments, the material may contain some Yttrium. In some embodiments, the material may contain no Yttrium, for example as the material has been substituted out.

As shown in the above table, embodiments of the synthetic garnet can achieve very high dielectric constants. For example, embodiments of the synthetic garnet can achieve dielectric constants of above 35, above 36, or about 38 (or above about 35, above about 36, or above about 38). Accordingly, devices, such as circulators and isolators, can be about 5% to 10% smaller in diameter than a device having a dielectric constant of 32. This allows for an overall smaller footprint of the device, allowing for more of the device to be located in a concentrated area.

Further, embodiments of the disclosure can have very high magnetization along with the high dielectric constant, which allows them to be used over a specific frequency range. As shown above, embodiments of the synthetic garnet can be above 1600, 1700, 1800, or 1900 (or above about 1600, about 1700, about 1800, or about 1900), as opposed to 1500 which has been used previously. This allows devices incorporating such materials to be used in higher frequency ranges.

Preparation of the Modified Synthetic Garnet Compositions:

The preparation of the modified synthetic garnet materials can be accomplished by using known ceramic techniques. A particular example of the process flow is illustrated in FIG. 3.

Figure 3:
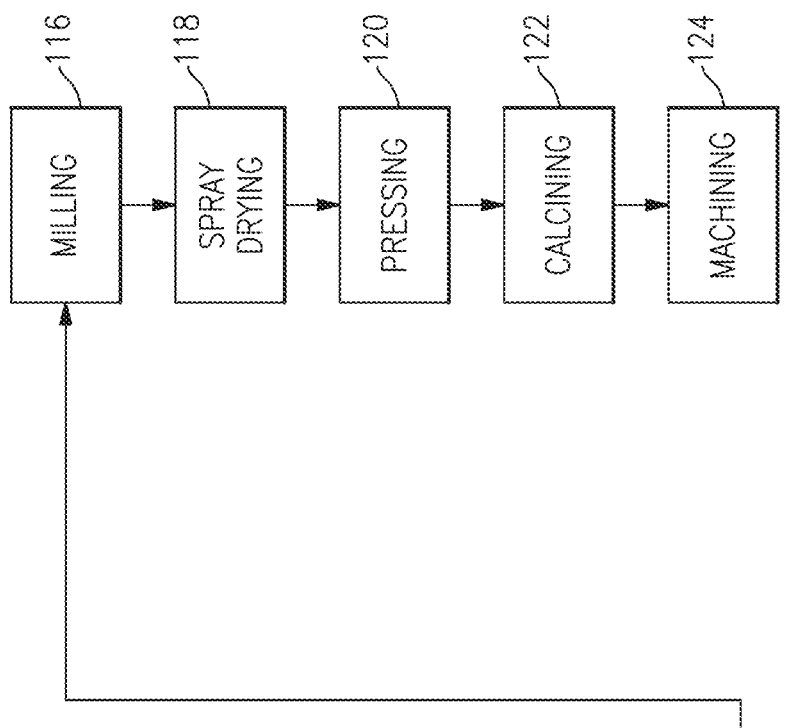
FIG. 3 illustrates an example process flow for making an embodiment of a modified synthetic garnet having one or more features described herein.
Figure 3:
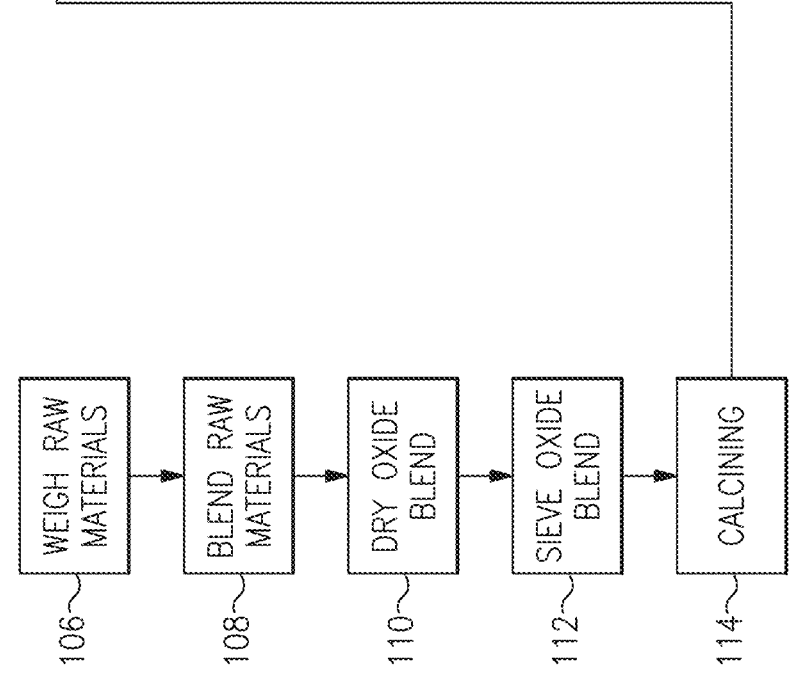

As shown in FIG. 3, the process begins with step 106 for weighing the raw material. The raw material may include oxides and carbonates such as, for example, Iron Oxide ($Fe_2O_3$), Bismuth Oxide ($Bi_2O_3$), Yttrium Oxide ($Y_2O_3$), Calcium Carbonate ($CaCO_3$), Zirconium Oxide ($ZrO_2$), Gadolinium Oxide ($Gd_2O_3$), Vanadium Pentoxide ($V_2O_5$), Yttrium Vanadate ($YVO_4$), Bismuth Niobate ($BiNbO_4$), Silica ($SiO_2$), Niobium Pentoxide ($Nb_2O_5$), Antimony Oxide ($Sb_2O_3$), Molybdenum Oxide ($MoO_3$), Indium Oxide ($In_2O_3$), or combinations thereof. In some embodiments, raw material consisting essentially of about 35-40 wt % Bismuth Oxide, more preferably about 38.61 wt %; about 10-12 wt % Calcium Oxide, more preferably about 10.62 wt %; about 35-40 wt % Iron Oxide, more preferably about 37 wt %, about 5-10 wt % Zirconium Oxide, more preferably about 8.02 wt %; about 4-6 wt % Vanadium Oxide, more preferably about 5.65 wt %. In addition, organic based materials may be used in a sol gel process for ethoxides and/or acrylates or citrate based techniques may be employed. Other known methods in the art such as co-precipitation of hydroxides, sol-gel, or laser ablation may also be employed as a method to obtain the materials. The amount and selection of raw material depend on the specific formulation.

After the raw materials are weighed, they are blended in Step 108 using methods consistent with the current state of the ceramic art, which can include aqueous blending using a mixing propeller, or aqueous blending using a vibratory mill with steel or zirconia media. In some embodiments, a glycine nitrate or spray pyrolysis technique may be used for blending and simultaneously reacting the raw materials.

The blended oxide is subsequently dried in Step 110, which can be accomplished by pouring the slurry into a pane and drying in an oven, preferably between 100-400° C. or by spray drying, or by other techniques known in the art.

The dried oxide blend is processed through a sieve in Step 112, which homogenizes the powder and breaks up soft agglomerates that may lead to dense particles after calcining.

The material is subsequently processed through a pre-sintering calcining in Step 114. Preferably, the material is loaded into a container such as an alumina or cordierite sagger and heat treated in the range of about 800-1000° C. In some embodiments, a heat treatment in the range of about 500-1000° C. can be used. In some embodiments, a heat treatment in the range of about 900-950° C. can be used. In some embodiments, a heat treatment in the range of about 500-700° C. can be used. Preferably, the firing temperature is low as higher firing temperatures have an adverse effect on linewidth.

After calcining, the material is milled in Step 116, preferably in a vibratory mill, an attrition mill, a jet mill or other standard comminution technique to reduce the median particle size into the range of about 0.01 to 0.1 microns, though in some embodiments larger sizes such as 0.5 micron to 10 microns can be used as well. Milling is preferably done in a water based slurry but may also be done in ethyl alcohol or another organic based solvent.

The material is subsequently spray dried in Step 118. During the spray drying process, organic additives such as binders and plasticizers can be added to the slurry using techniques known in the art. The material is spray dried to provide granules amenable to pressing, preferably in the range of about 10 microns to 150 microns in size.

The spray dried granules are subsequently pressed in Step 120, preferably by uniaxial or isostatic pressing to achieve a pressed density to as close to 60% of the x-ray theoretical density as possible. In addition, other known methods such as tape casting, tape calendaring or extrusion may be employed as well to form the unfired body.

The pressed material is subsequently processed through a calcining process in Step 122. Preferably, the pressed material is placed on a setter plate made of material such as alumina which does not readily react with the garnet material. The setter plate is heated in a periodic kiln or a tunnel kiln in air or pressure oxygen in the range of between about 850° C.-1000° C. to obtain a dense ceramic compact. In some embodiments, a heat treatment in the range of about 500-1000° C. can be used. In some embodiments, a heat treatment in the range of about 500-700° C. can be used. Other known treatment techniques, such as induction heat, hot pressing, fast firing, or assisted fast firing, may also be used in this step. In some embodiments, a density having >98% of the theoretical density can be achieved.

The dense ceramic compact is machined in the Step 124 to achieve dimensions suitable or the particular applications.

Devices Incorporating Ultra High Dielectric Constant Garnet

Radio-frequency (RF) applications that utilize synthetic garnet compositions, such as those disclosed above, can include ferrite devices having relatively low magnetic resonance linewidths. RF applications can also include devices, methods, and/or systems having or related to garnet compositions having reduced or substantially nil reduced earth content. As described herein, such garnet compositions can be configured to yield relatively high dielectric constants; and such a feature can be utilized to provide advantageous functionalities. It will be understood that at least some of the compositions, devices, and methods described in reference above can be applied to such implementations.

Figure 4:
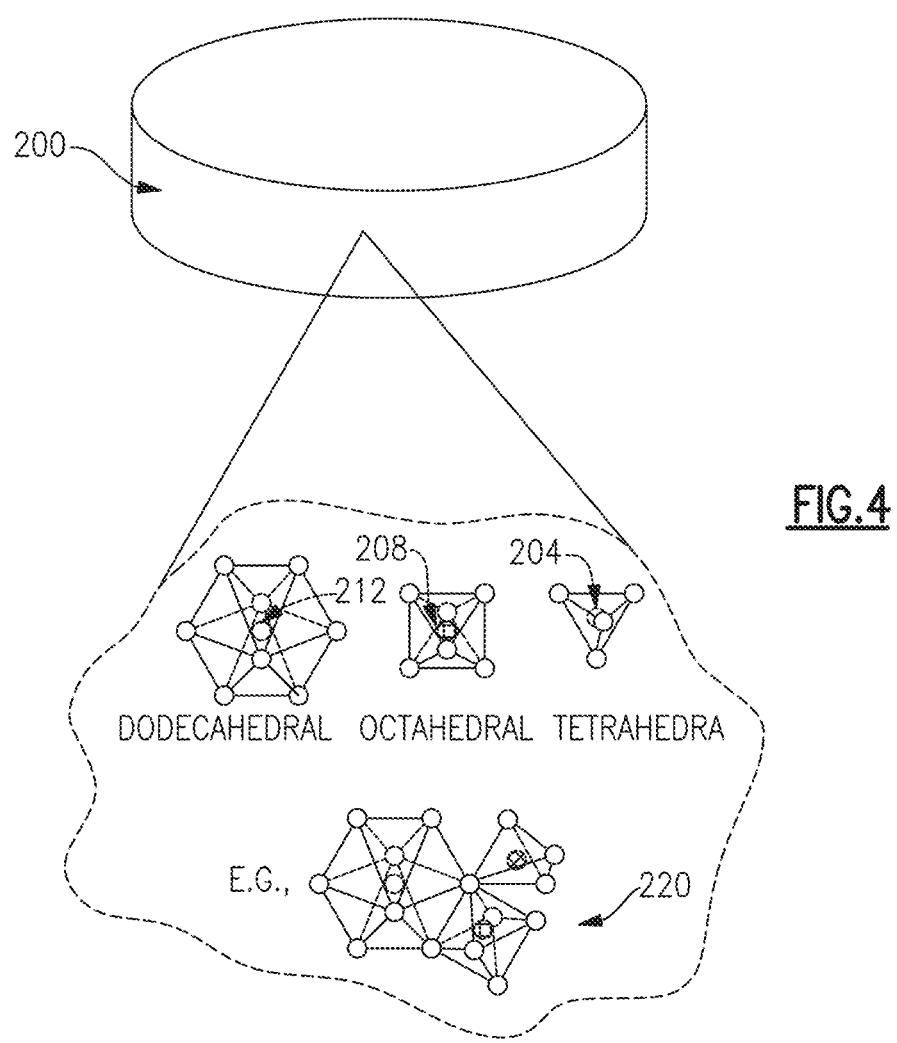
FIG. 4 shows an example ferrite device having one or more garnet features as described herein.

FIG. 4 shows a radio-frequency (RF) device 200 having garnet structure and chemistry such as disclosed herein, and thus a plurality of dodecahedral structures, octahedral structures, and tetrahedral structures. The device 200 can include garnet structures (e.g., a garnet structure 220) formed from such dodecahedral, octahedral, and tetrahedral structures. Disclosed herein are various examples of how dodecahedral sites 212, octahedral sites 208, and tetrahedral sites 204 can be filled by or substituted with different ions to yield one or more desirable properties for the RF device 200. Such properties can include, but are not limited to desirable RF properties and cost-effectiveness of manufacturing of ceramic materials that can be utilized to fabricate the RF device 200. By way of an example, disclosed herein are ceramic materials having relatively high dielectric constants, and having reduced or substantially nil rare earth contents.

Some design considerations for achieving such features are now described. Also described are example devices and related RF performance comparisons. Also described are example applications of such devices, as well as fabrication examples.

Bismuth Garnets:

Single crystal materials with a formula $Bi_{(3-2x)}Ca_{2x}Fe_{5-x}V_xO_{12}$ have been grown in the past, where x was 1.25. A $4\pi M_s$ value of about 600 Gauss was obtained (which is suitable for some tunable filters and resonators in a 1-2 GHz range), with linewidths of about 1 Oersted, indicating low intrinsic magnetic losses for the system. However, the level of Bi substitution was only about 0.5 in the formula.

Attempts to make single phase polycrystalline materials (with a formula $Bi_{3-2x}Ca_{2x}V_xFe_{5-x}O_{12}$) similar to the single crystal materials were successful only in a region of x>0.96, effectively confining the $4\pi M_s$ to less than about 700 Oersted and resulting in poor linewidths (greater than 100 Oersted). Small amounts of $Al^{+3}$ reduced the linewidth to about 75 Oersted, but increased $Al^{+3}$ reduced $4\pi M_s$. Bi substitution was only about 0.4 in the formula for these materials.

For Faraday rotation devices, the Faraday rotation can be essentially proportionate to the level of Bi substitution in garnets, raising interest in increasing the level of substitution. Anisotropy is generally not a major factor for optical applications, so substitution on the octahedral and tetrahedral site can be based on maximizing the rotation. Thus, in such applications, it may be desirable to introduce as much $Bi^{+3}$ into the dodecahedral site as possible. The maximum level of $Bi^{+3}$ can be influenced by the size of the dodecahedral rare earth trivalent ion.

In some situations, the level of $Bi^{+3}$ substitution can be affected by substitutions on the other sites. Because $Bi^{+3}$ is non-magnetic, it can influence the Faraday rotation through its effect on the tetrahedral and octahedral $Fe^{+3}$ ions. Since this is thought to be a spin-orbital interaction, where $Bi^{+3}$ modifies existing $Fe^{+3}$ pair transitions, one can expect both a change in the anisotropy of the $Fe^{+3}$ ions and optical effects including large Faraday rotation. The Curie temperature of $Bi^{+3}$ substituted YIG can also increase at low $Bi^{+3}$ substitution.

Examples of Devices Having Rare Earth Free or Reduced Garnets:

As described herein, garnets having reduced or no rare earth content can be formed, and such garnets can have desirable properties for use in devices for applications such as RF applications. In some implementations, such devices can be configured to take advantage of unique properties of the $Bi^{+3}$ ion. For example, the "lone pair" of electrons on the $Bi^{+3}$ ion can raise the ionic polarizability and hence the dielectric constant.

Further, because the center frequency of a ferrite device (such as a garnet disk) operating in a split polarization transverse magnetic (TM) mode is proportional to $1/(\varepsilon)^{1/2}$, doubling the dielectric constant ($\varepsilon$) can reduce the frequency by a factor of square root of 2 (approximately 1.414). As described herein in greater detail, increasing the dielectric constant by, for example, a factor of 2, can result in a reduction in a lateral dimension (e.g., diameter) of a ferrite disk by factor of square root of 2. Accordingly, the ferrite disk's area can be reduced by a factor of 2. Such a reduction in size can be advantageous since the device's footprint area on an RF circuit board can be reduced (e.g., by a factor of 2 when the dielectric constant is increased by a factor of 2). Although described in the context of the example increase by a factor of 2, similar advantages can be realized in configurations involving factors that are more or less than 2.

Reduced Size Circulators/Isolators Having Ferrite with High Dielectric Constant

As described herein, ferrite devices having garnets with reduced or no rare earth content can be configured to include a high dielectric constant property. Various design considerations concerning dielectric constants as applied to RF applications are now described. In some implementations, such designs utilizing garnets with high dielectric constants may or may not necessarily involve rare earth free configurations.

Values of dielectric constant for microwave ferrite garnets and spinels commonly fall in a range of 12 to 18 for dense polycrystalline ceramic materials. Such garnets are typically used for above ferromagnetic resonance applications in, for example, UHF and low microwave region, because of their low resonance linewidth. Such spinels are typically used at, for example, medium to high microwave frequencies, for below resonance applications, because of their higher magnetization. Most, if not substantially all, circulators or isolators that use such ferrite devices are designed with triplate/stripline or waveguide structures.

Dielectric constant values for low linewidth garnets is typically in a range of 14 to 16. These materials can be based on Yttrium iron garnet (YIG) with a value of approximately 16, or substituted versions of that chemistry with Aluminum or, for example, Zirconium/Vanadium combinations which can reduce the value to around 14. Although for example Lithium Titanium based spinel ferrites exist with dielectric constants up to close to 20, these generally do not have narrow linewidths; and thus are not suitable for many RF applications. However, as described in detail above, garnets made using Bismuth substituted for Yttrium can have much higher dielectric constants.

In some embodiments, an increase in dielectric constant can be maintained for compositions containing Bismuth, including those with other non-magnetic substitution on either or both of the octahedral and tetrahedral sites (e.g., Zirconium or Vanadium, respectively). By using ions of higher polarization, it is possible to further increase the dielectric constant. For example, Niobium or Titanium can be substituted into the octahedral or tetrahedral site; and Titanium can potentially enter both sites.

In some embodiments, a relationship between ferrite device size, dielectric constant, and operating frequency can be represented as follows. There are different equations that can characterize different transmission line representations. For example, in above-resonance stripline configurations, the radius R of a ferrite disk can be characterized as $$R=1.84/[2\pi(\text{effective permeability})\times(\text{dielectric constant})]^{1/2} \quad (1)$$

where (effective permeability)=$H_{dc}+4\pi M_s/H_{dc}$, with $H_{dc}$ being the magnetic field bias. Equation 1 shows that, for a fixed frequency and magnetic bias, the radius R is inversely proportional to the square root of the dielectric constant.

In another example, in below-resonance stripline configurations, a relationship for ferrite disk radius R similar to Equation 1 can be utilized for weakly coupled quarter wave circulators where the low bias field corresponds to below-resonance operation. For below-resonance waveguide configurations (e.g., in disk or rod waveguides), both lateral dimension (e.g., radius R) and thickness d of the ferrite can influence the frequency. However, the radius R can still be expressed as $$R=\lambda/[2\pi(\text{dielectric constant})^{1/2}][((\pi R)/(2d))^2+(1.84)^2]^{1/2} \quad (2)$$

which is similar to Equation 1 in terms of relationship between R and dielectric constant.

The example relationship of Equation 2 is in the context of a circular disk shaped ferrites. For a triangular shaped resonator, the same waveguide expression can used, but in this case, A (altitude of the triangle) being equal to 3.63×$\lambda/2\pi$ applies instead of the radius in the circular disk case.

In all of the foregoing example cases, one can see that by increasing the dielectric constant (e.g., by a factor of 2), one can expect to reduce the size of the ferrite (e.g., circular disk or triangle) by a factor of square root of 2, and thereby reduce the area of the ferrite by a factor of 2. As described in reference to Equation 2, thickness of the ferrite can also be reduced.

In implementations where ferrite devices are used as RF devices, sizes of such RF devices can also be reduced. For example, in a stripline device, a footprint area of the device can be dominated by the area of the ferrite being used. Thus, one can expect that a corresponding reduction in device size would be achieved. In a waveguide device, a diameter of the ferrite being used can be a limiting factor in determining size. However, a reduction provided for the ferrite diameter may be offset by the need to retain wavelength-related dimensions in the metal part of the junction.

Examples of Reduced-Size Ferrite

As described herein, ferrite size can be reduced significantly by increasing the dielectric constant associated with garnet structures. Also as described herein, garnets with reduced Yttrium and/or reduced non-Y rare earth content can be formed by appropriate Bismuth substitutions. In some embodiments, such garnets can include Yttrium-free or rare earth free garnets. An example RF device having ferrite devices with increased dielectric constant and Yttrium-free garnets is described in reference to FIGS. 5A-6B.

Figure 5A:
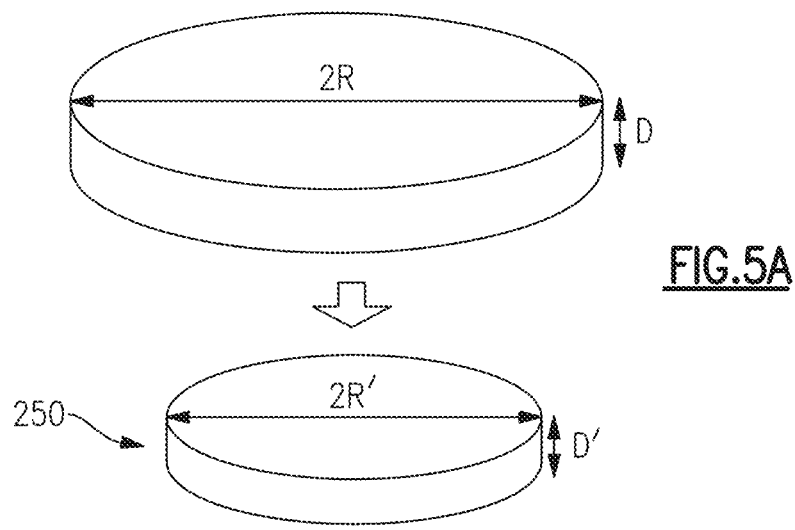
FIGS. 5A and 5B show examples of size reduction that can be implemented for ferrite devices having one or more features as described herein.
Figure 5B:
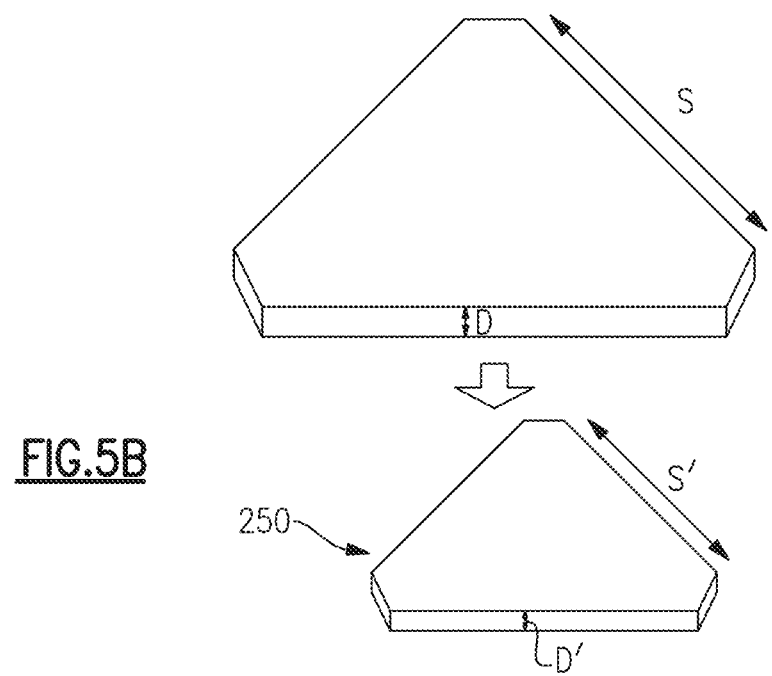

FIGS. 5A and 5B summarize the example ferrite size reductions described herein. As described herein and shown in FIG. 5A, a ferrite device 250 can be a circular-shaped disk having a reduced diameter of 2R' and a thickness of d'. The thickness may or may not be reduced. As described in reference to Equation 1, the radius R of a circular-shaped ferrite disk can be inversely proportional to the square root of the ferrite's dielectric constant. Thus, the increased dielectric constant of the ferrite device 250 is shown to yield its reduced diameter 2R'.

As described herein and shown in FIG. 5B, a ferrite device 250 can also be a triangular-shaped disk having a reduced side dimension of S' and a thickness of d'. The thickness may or may not be reduced. As described in reference to Equation 2, the altitude A of a triangular-shaped ferrite disk (which can be derived from the side dimension S) can be inversely proportional to the square root of the ferrite's dielectric constant. Thus, the increased dielectric constant of the ferrite device 250 is shown to yield its reduced dimension S'.

Although described in the context of example circular and triangle shaped ferrites, one or more features of the present disclosure can also be implemented in other shaped ferrites.

Figure 6A:
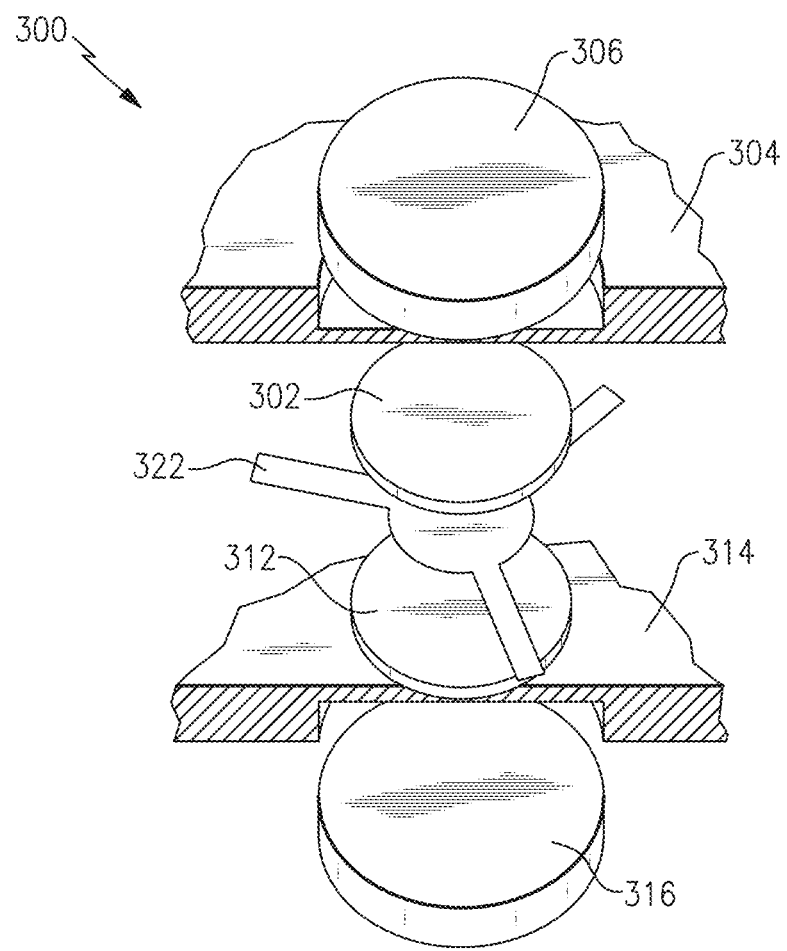
FIGS. 6A and 6B show an example circulator/isolator having ferrite devices as described herein.
Figure 6B:
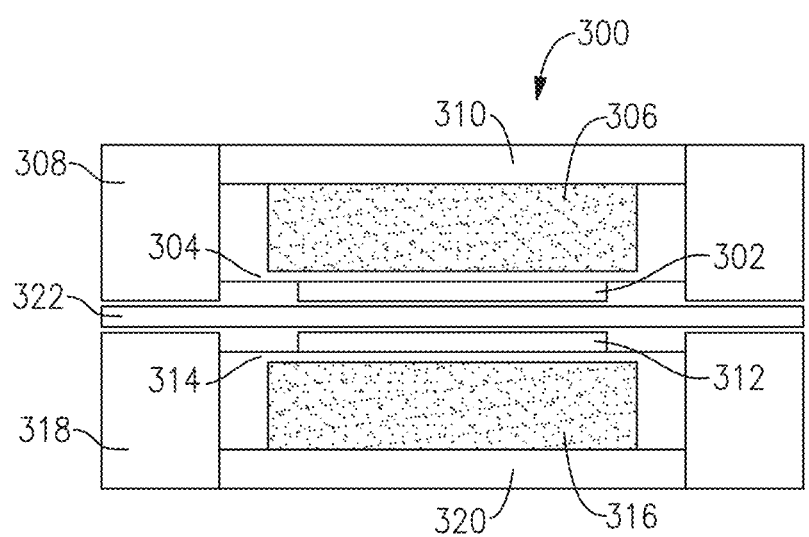

FIGS. 6A and 6B show an example of a circulator 300 having a pair of ferrite disks 302, 312 disposed between a pair of cylindrical magnets 306, 316. Each of the ferrite disks 302, 312 can be a ferrite disk having one or more features described herein. FIG. 6A shows an un-assembled view of a portion of the example circulator 300. FIG. 6B shows a side view of the example circulator 300.

In the example shown, the first ferrite disk 302 is shown to be mounted to an underside of a first ground plane 304. An upper side of the first ground plane 304 is shown to define a recess dimensioned to receive and hold the first magnet 306. Similarly, the second ferrite disk 312 is shown to be mounted to an upper side of a second ground plane 314; and an underside of the second ground plane 314 is shown to define a recess dimensioned to receive and hold the second magnet 316.

The magnets 306, 316 arranged in the foregoing manner can yield generally axial field lines through the ferrite disks 302, 312. The magnetic field flux that passes through the ferrite disks 302, 312 can complete its circuit through return paths provided by 320, 318, 308 and 310 so as to strengthen the field applied to the ferrite disks 302, 312. In some embodiments, the return path portions 320 and 310 can be disks having a diameter larger than that of the magnets 316, 306; and the return path portions 318 and 308 can be hollow cylinders having an inner diameter that generally matches the diameter of the return path disks 320, 310. The foregoing parts of the return path can be formed as a single piece or be an assembly of a plurality of pieces.

The example circulator device 300 can further include an inner flux conductor (also referred to herein as a center conductor) 322 disposed between the two ferrite disks 302, 312. Such an inner conductor can be configured to function as a resonator and matching networks to the ports (not shown).

Various examples of new garnet systems and devices related thereto are described herein. In some embodiments, such garnet systems can contain high levels of Bismuth, which can allow formation of low loss ferrite devices. Further, by selected addition of other elements, one can reduce or eliminate rare earth content of garnets, including commercial garnets. Reduction or elimination of such rare earth content can include, but is not limited to, Yttrium. In some embodiments, the garnet systems described herein can be configured to significantly increase (e.g., double) the dielectric constant of non-Bi garnets, thereby offering the possibility of significantly decreasing (e.g., halving) the printed circuit "footprint" of ferrite devices associated with conventional garnets.

Figure 7:
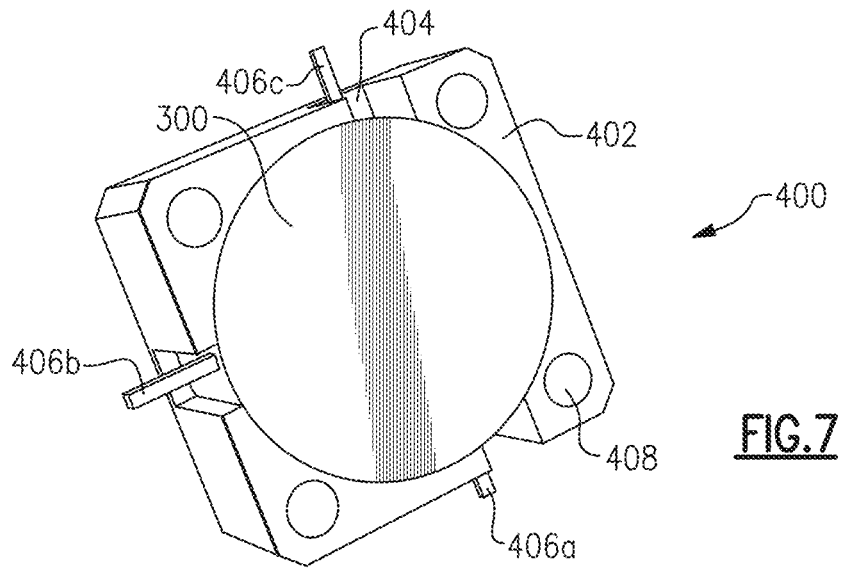
FIG. 7 shows an example of a packaged circulator module.

In some embodiments, ferrite-based circulator devices having one or more features as described herein can be implemented as a packaged modular device. FIG. 7 shows an example packaged device 400 having a circulator device 300 (for example as shown in FIG. 6B) mounted on a packaging platform 404 and enclosed by a housing structure 402. The example platform 404 is depicted as including a plurality of holes 408 dimensioned to allow mounting of the packaged device 400. The example packaged device 400 is shown further include example terminals 406a-406c configured to facilitate electrical connections.

Figure 17:
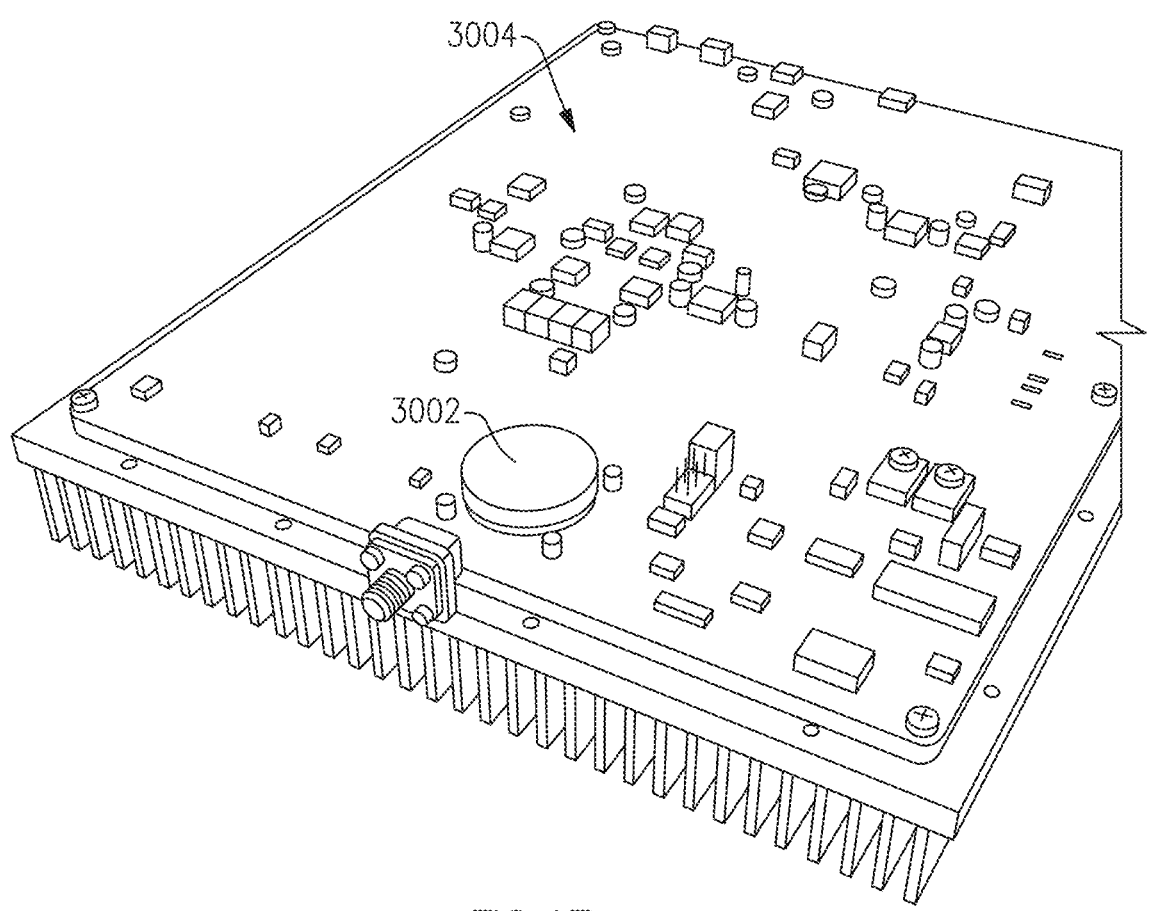
FIG. 17 illustrates an embodiment of a circuit board including embodiments of the material disclosed herein.

In some embodiments, a packaged circulator/isolator 3002 such as the example of FIG. 7 can be implemented in a circuit board or module 3004 as shown in FIG. 17. Such a circuit board can include a plurality of circuits configured to perform one or more radio-frequency (RF) related operations. The circuit board can also include a number of connection features configured to allow transfer of RF signals and power between the circuit board and components external to the circuit board.

Figure 8:
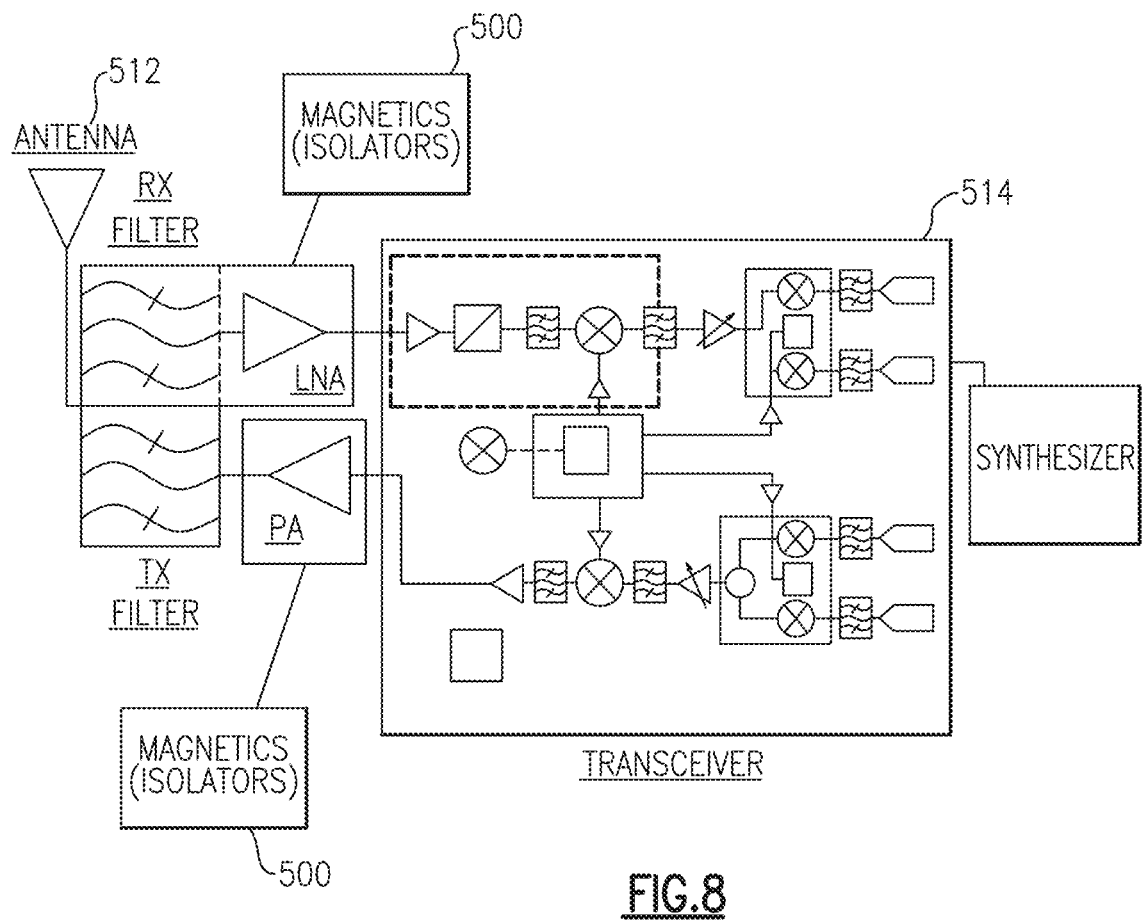
FIG. 8 shows an example RF system where one or more of circulator/isolator devices as described herein can be implemented.

In some embodiments, the foregoing example circuit board can include RF circuits associated with a front-end module of an RF apparatus. As shown in FIG. 8, such an RF apparatus can include an antenna 512 that is configured to facilitate transmission and/or reception of RF signals. Such signals can be generated by and/or processed by a transceiver 514. For transmission, the transceiver 514 can generate a transmit signal that is amplified by a power amplifier (PA) and filtered (Tx Filter) for transmission by the antenna 512. For reception, a signal received from the antenna 512 can be filtered (Rx Filter) and amplified by a low-noise amplifier (LNA) before being passed on to the transceiver 514. In the example context of such Tx and Rx paths, circulators and/or isolators 500 having one or more features as described herein can be implemented at or in connection with, for example, the PA circuit and the LNA circuit.

In some embodiments, circuits and devices having one or more features as described herein can be implemented in RF applications such as a wireless base-station. Such a wireless base-station can include one or more antennas 512, such as the example described in reference to FIG. 8, configured to facilitate transmission and/or reception of RF signals. Such antenna(s) can be coupled to circuits and devices having one or more circulators/isolators as described herein.

As described herein, terms "circulator" and "isolator" can be used interchangeably or separately, depending on applications as generally understood. For example, circulators can be passive devices utilized in RF applications to selectively route RF signals between an antenna, a transmitter, and a receiver. If a signal is being routed between the transmitter and the antenna, the receiver preferably should be isolated. Accordingly, such a circulator is sometimes also referred to as an isolator; and such an isolating performance can represent the performance of the circulator.

Fabrication of RF Devices

Figure 9:
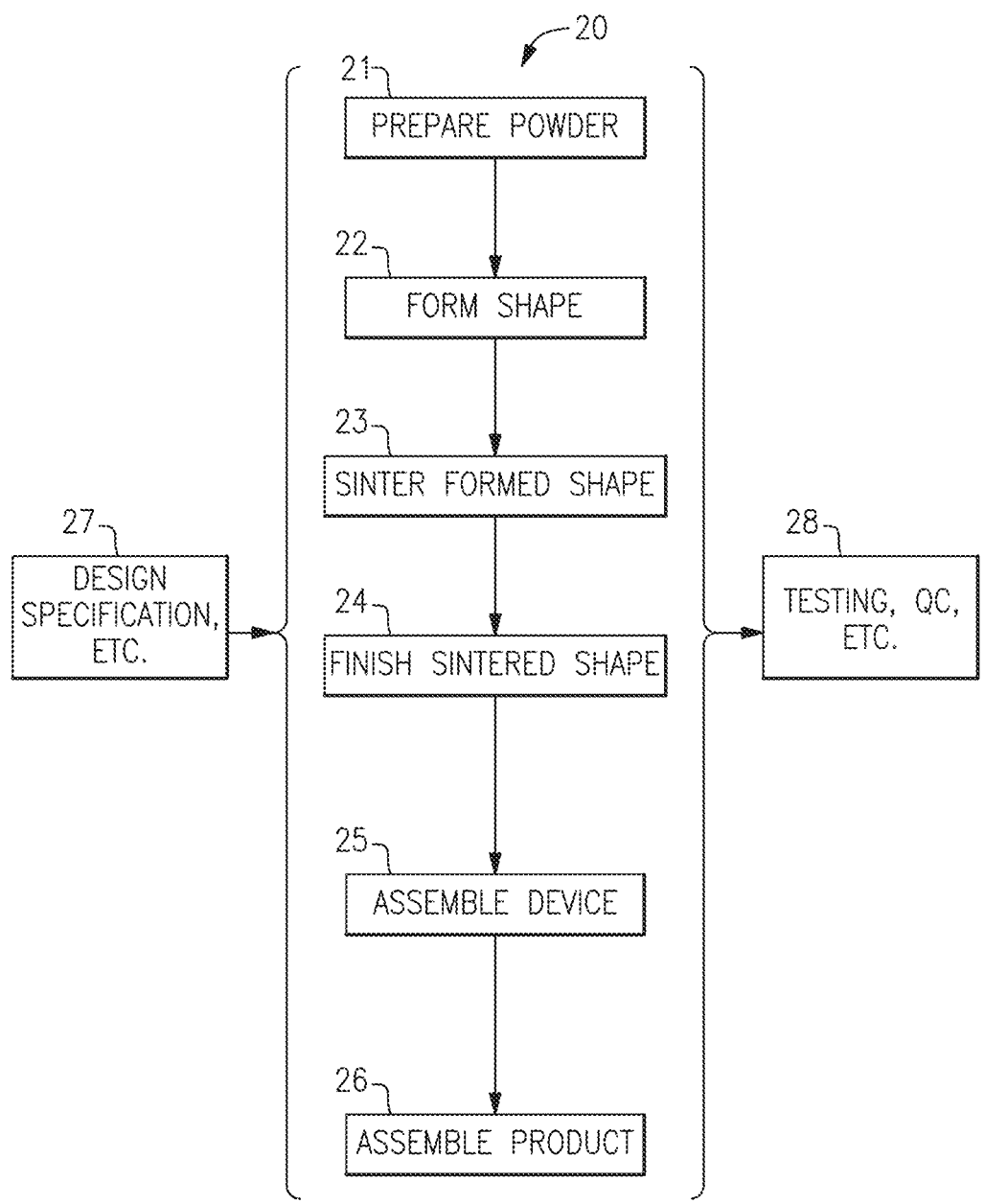
FIG. 9 shows a process that can be implemented to fabricate a ceramic material having one or more features as described herein.

FIGS. 9-13 show examples of how ferrite devices having one or more features as described herein can be fabricated. FIG. 9 shows a process 20 that can be implemented to fabricate a ceramic material having one or more of the foregoing properties. In block 21, powder can be prepared. In block 22, a shaped object can be formed from the prepared powder. In block 23, the formed object can be sintered. In block 24, the sintered object can be finished to yield a finished ceramic object having one or more desirable properties.

In implementations where the finished ceramic object is part of a device, the device can be assembled in block 25. In implementations where the device or the finished ceramic object is part of a product, the product can be assembled in block 26.

FIG. 9 further shows that some or all of the steps of the example process 20 can be based on a design, specification, etc. Similarly, some or all of the steps can include or be subjected to testing, quality control, etc.

Figure 14:
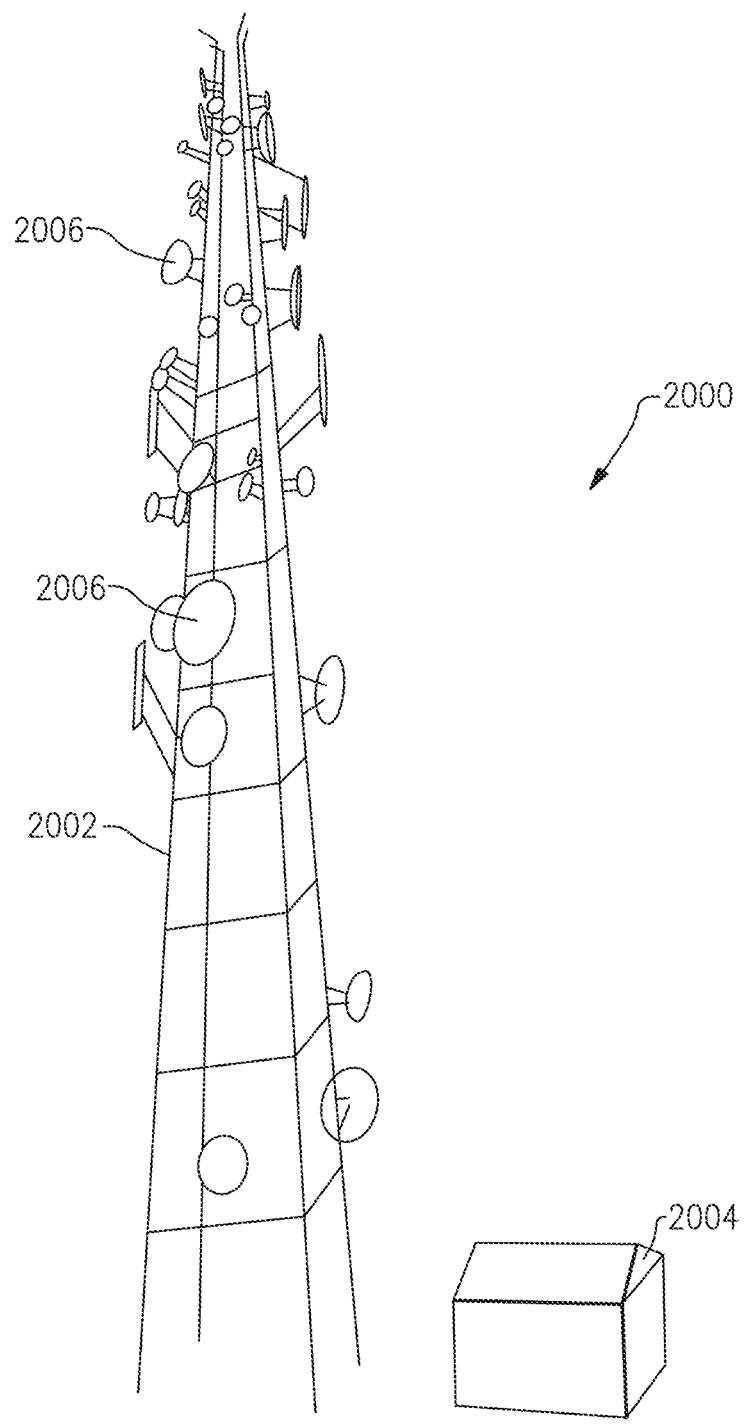
FIG. 14 illustrates a perspective view of a cellular antenna base station incorporating embodiments of the disclosure.

In some implementations, the powder preparation step (block 21) of FIG. 9 can be performed by the example process described in reference to FIG. 14. Powder prepared in such a manner can include one or more properties as described herein, and/or facilitate formation of ceramic objects having one or more properties as described herein.

In some implementations, powder prepared as described herein can be formed into different shapes by different forming techniques. By way of examples, FIG. 10 shows a process 50 that can be implemented to press-form a shaped object from a powder material prepared as described herein. In block 52, a shaped die can be filled with a desired amount of the powder. In FIG. 11, configuration 60 shows the shaped die as 61 that defines a volume 62 dimensioned to receive the powder 63 and allow such power to be pressed. In block 53, the powder in the die can be compressed to form a shaped object. Configuration 64 shows the powder in an intermediate compacted form 67 as a piston 65 is pressed (arrow 66) into the volume 62 defined by the die 61. In block 54, pressure can be removed from the die. In block 55, the piston (65) can be removed from the die (61) so as to open the volume (62). Configuration 68 shows the opened volume (62) of the die (61) thereby allowing the formed object 69 to be removed from the die (61). In block 56, the formed object (69) can be removed from the die (61). In block 57, the formed object can be stored for further processing.

Figures 12, 13:
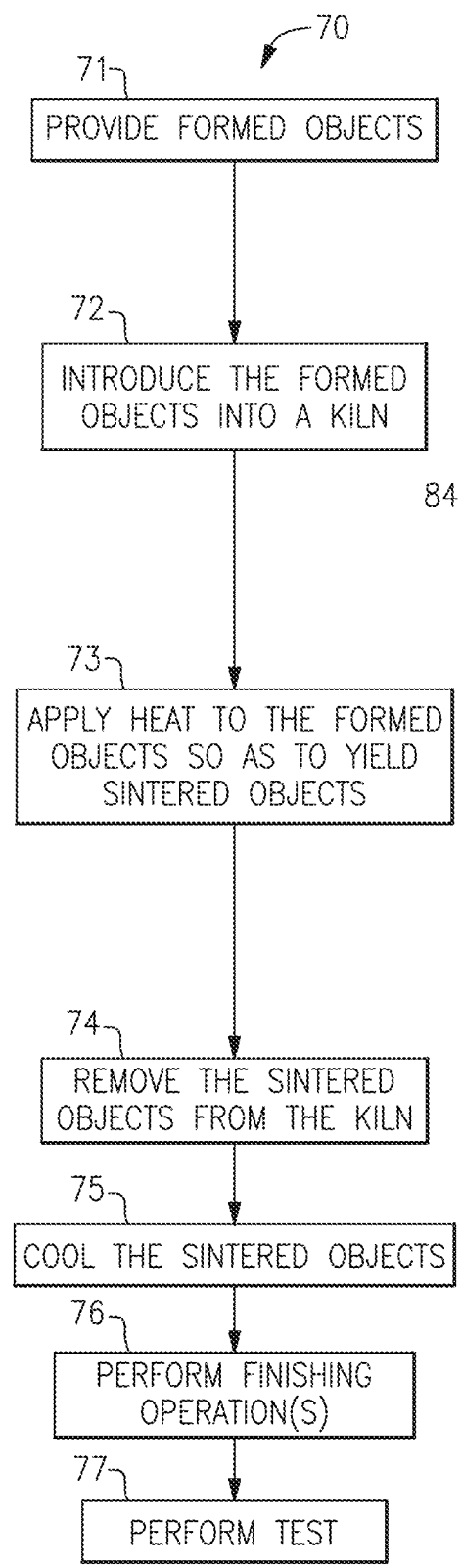
FIG. 12 shows a process that can be implemented to sinter formed objects such as those formed in the example of FIGS. 10 and 11.
FIG. 13 shows examples of various stages of the process of FIG. 12.

In some implementations, formed objects fabricated as described herein can be sintered to yield desirable physical properties as ceramic devices. FIG. 12 shows a process 70 that can be implemented to sinter such formed objects. In block 71, formed objects can be provided. In block 72, the formed objects can be introduced into a kiln. In FIG. 13, a plurality of formed objects 69 are shown to be loaded into a sintering tray 80. The example tray 80 is shown to define a recess 83 dimensioned to hold the formed objects 69 on a surface 82 so that the upper edge of the tray is higher than the upper portions of the formed objects 69. Such a configuration allows the loaded trays to be stacked during the sintering process. The example tray 80 is further shown to define cutouts 83 at the side walls to allow improved circulation of hot gas at within the recess 83, even when the trays are stacked together. FIG. 13 further shows a stack 84 of a plurality of loaded trays 80. A top cover 85 can be provided so that the objects loaded in the top tray generally experience similar sintering condition as those in lower trays.

In block 73, heat can be applied to the formed objects so as to yield sintered objects. Such application of heat can be achieved by use of a kiln. In block 74, the sintered objects can be removed from the kiln. In FIG. 13, the stack 84 having a plurality of loaded trays is depicted as being introduced into a kiln 87 (stage 86a). Such a stack can be moved through the kiln (stages 86b, 86c) based on a desired time and temperature profile. In stage 86d, the stack 84 is depicted as being removed from the kiln so as to be cooled.

In block 75, the sintered objects can be cooled. Such cooling can be based on a desired time and temperature profile. In block 206, the cooled objects can undergo one or more finishing operations. In block 207, one or more tests can be performed.

Heat treatment of various forms of powder and various forms of shaped objects are described herein as calcining, firing, annealing, and/or sintering. It will be understood that such terms may be used interchangeably in some appropriate situations, in context-specific manners, or some combination thereof.

Telecommunication Base Station

Circuits and devices having one or more features as described herein can be implemented in RF applications such as a wireless base-station. Such a wireless base-station can include one or more antennas configured to facilitate transmission and/or reception of RF signals. Such antenna(s) can be coupled to circuits and devices having one or more circulators/isolators as described herein.

Thus, in some embodiments, the above disclosed material can be incorporated into different components of a telecommunication base station, such as used for cellular networks and wireless communications. An example perspective view of a base station 2000 is shown in FIG. 14, including both a cell tower 2002 and electronics building 2004. The cell tower 2002 can include a number of antennas 2006, typically facing different directions for optimizing service, which can be used to both receive and transmit cellular signals while the electronics building 2004 can hold electronic components such as filters, amplifiers, etc. discussed below. Both the antennas 2006 and electronic components can incorporate embodiments of the disclosed ceramic materials.

FIG. 11 shows a schematic view of a base station such as shown in FIG. 14. As shown, the base station can include an antenna 412 that is configured to facilitate transmission and/or reception of RF signals. Such signals can be generated by and/or processed by a transceiver 414. For transmission, the transceiver 414 can generate a transmit signal that is amplified by a power amplifier (PA) and filtered (Tx Filter) for transmission by the antenna 412. For reception, a signal received from the antenna 412 can be filtered (Rx Filter) and amplified by a low-noise amplifier (LNA) before being passed on to the transceiver 414. In the example context of such Tx and Rx paths, circulators and/or isolators 400 having one or more features as described herein can be implemented at or in connection with, for example, the PA circuit and the LNA circuit. The circulators and isolators can include embodiments of the material disclosed herein. Further, the antennas can include the materials disclosed herein, allowing them to work on higher frequency ranges.

Figure 15:
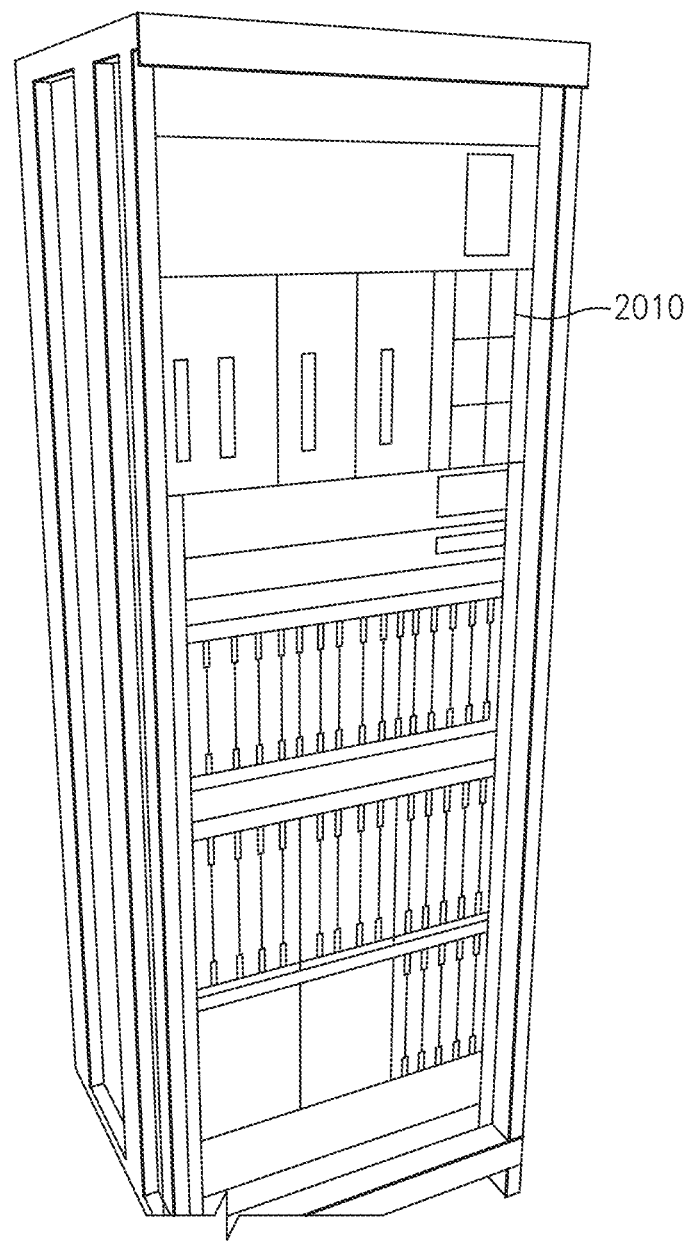
FIG. 15 illustrates housing components of a base station incorporating embodiments of the disclosed material.

FIG. 15 illustrates hardware 2010 that can be used in the electronics building 2004, and can include the components discussed above with respect to FIG. 11. For example, the hardware 2010 can be a base station subsystem (BSS), which can handle traffic and signaling for the mobile systems.

Figure 16:
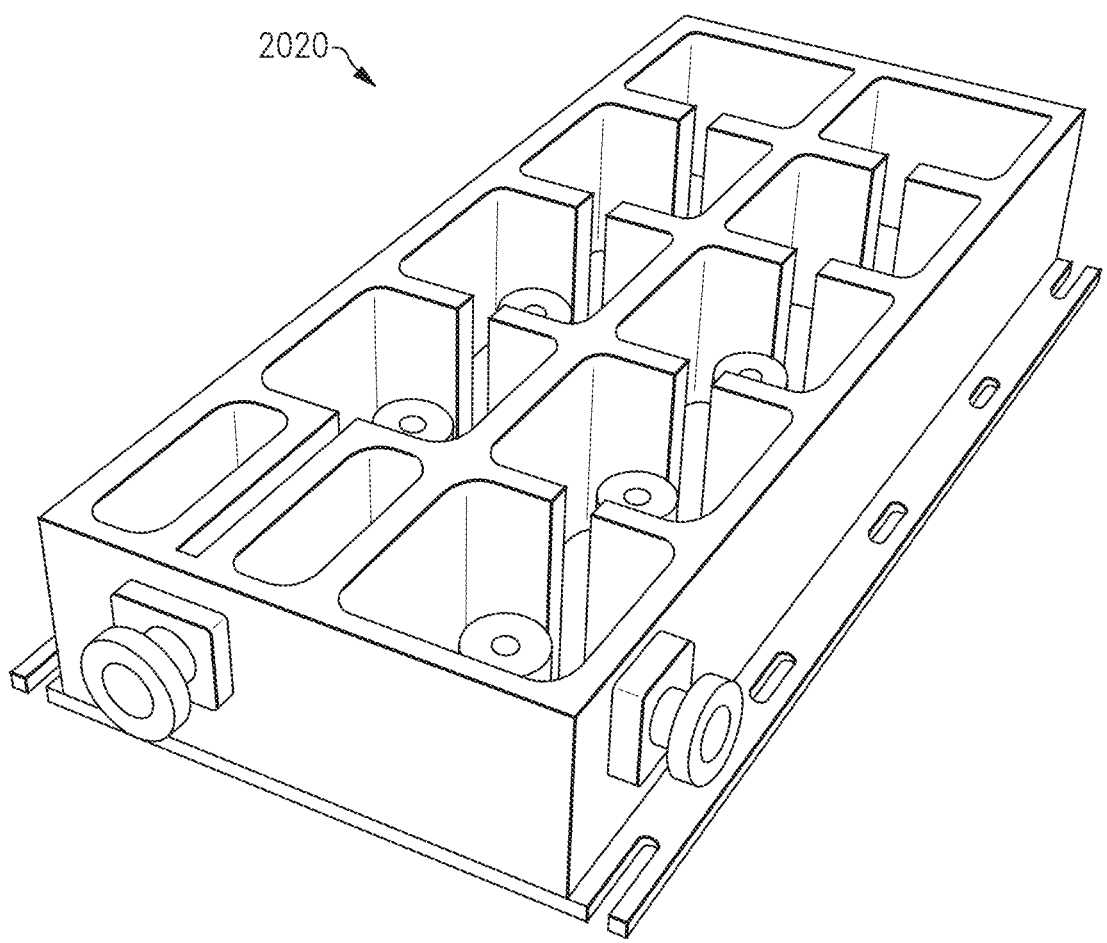
FIG. 16 illustrates a cavity filter used in a base station incorporating embodiments of the material disclosed herein.

FIG. 16 illustrates a further detailing of the hardware 2010 discussed above. Specifically, FIG. 16 depicts a cavity filter/combiner 2020 which can be incorporated into the base station. The cavity filter 2020 can include, for example, bandpass filters such as those incorporating embodiments of the disclosed material, and can allow the output of two or more transmitters on different frequencies to be combined.

From the foregoing description, it will be appreciated that an inventive garnets and method of manufacturing are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A radiofrequency device including a high dielectric garnet material, the radiofrequency device comprising:
a component formed from a synthetic garnet material having a structure including dodecahedral sites, the structure having bismuth occupying at least some of the dodecahedral sites, the structure having indium occupying an octahedral site, indium occupying at least some of the dodecahedral sites, and the structure having a dielectric constant value of at least 31.

2. The radiofrequency device of claim 1 wherein the structure contains no yttrium as yttrium has been substituted out.

3. The radiofrequency device of claim 1 wherein the synthetic garnet material includes iron and the indium substitutes for at least some of the iron.

4. The radiofrequency device of claim 1 further comprising an additional large rare earth ion occupying at least some of the dodecahedral sites.

5. The radiofrequency device of claim 4 wherein the additional large rare earth ion is ytterbium.

6. The radiofrequency device of claim 4 wherein the additional large rare earth ion is gadolinium.

7. The radiofrequency device of claim 1 wherein the structure further includes calcium.

8. The radiofrequency device of claim 7 wherein the structure further includes zirconium.

9. The radiofrequency device of claim 1 wherein the component is an antenna.

10. The radiofrequency device of claim 1 wherein the component is a circuit board.

11. A synthetic garnet material comprising a structure including dodecahedral sites, the structure having bismuth occupying at least some of the dodecahedral sites, the structure having indium occupying an octahedral site, indium occupying at least some of the dodecahedral sites, and and a dielectric constant value of at least 31.

12. The synthetic garnet material of claim 11 wherein the structure includes iron and the indium substitutes for at least some of the iron.

13. The synthetic garnet material of claim 11 further comprising an additional large rare earth ion occupying at least some of the dodecahedral sites.

14. The synthetic garnet material of claim 13 wherein the additional large rare earth ion is ytterbium.

15. The synthetic garnet material of claim 13 wherein the additional large rare earth ion is gadolinium.

16. The synthetic garnet material of claim 11 wherein the structure further includes calcium.

17. The synthetic garnet material of claim 16 wherein the structure further includes zirconium.

18. A synthetic garnet material comprising a structure including dodecahedral sites, the structure having bismuth occupying at least some of the dodecahedral sites, the structure having an additional large rare earth ion occupying at least some of the dodecahedral sites, the structure having indium occupying an octahedral site and indium occupying at least some of the dodecahedral sites.

19. The synthetic garnet material of claim 18 wherein the structure includes iron and the indium substitutes for at least some of the iron.

20. The synthetic garnet material of claim 18 wherein the additional large rare earth ion is ytterbium.

21. The synthetic garnet material of claim 18 wherein the additional large rare earth ion is gadolinium.

\* \* \* \* \*